(12) United States Patent
Degrace et al.

(10) Patent No.: US 11,588,740 B2
(45) Date of Patent: Feb. 21, 2023

(54) SCALING HOST POLICY VIA DISTRIBUTION

(71) Applicant: MICROSOFT TECHNOLOGY LICENSING, LLC, Redmond, WA (US)

(72) Inventors: Gerald Roy Degrace, Atlanta, GA (US); Deepak Bansal, Bellevue, WA (US); Rishabh Tewari, Sammamish, WA (US); Michal Czeslaw Zygmunt, Redmond, WA (US); Deven Jagasia, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/335,027

(22) Filed: May 31, 2021

(65) Prior Publication Data
US 2022/0329528 A1    Oct. 13, 2022

Related U.S. Application Data

(60) Provisional application No. 63/173,348, filed on Apr. 9, 2021, provisional application No. 63/173,336, filed
(Continued)

(51) Int. Cl.
*G06F 15/177*    (2006.01)
*H04L 47/20*    (2022.01)
(Continued)

(52) U.S. Cl.
CPC .......... *H04L 47/20* (2013.01); *G06F 9/45558* (2013.01); *H04L 12/4641* (2013.01);
(Continued)

(58) Field of Classification Search
CPC . H04L 47/20; H04L 12/4641; H04L 41/0654; H04L 41/0806; H04L 41/0893;
(Continued)

(56) References Cited

U.S. PATENT DOCUMENTS

| 8,059,532 B2 | 11/2011 | Riddle et al. |
| 10,228,930 B2 | 3/2019 | Srinivasan et al. |

(Continued)

FOREIGN PATENT DOCUMENTS

| CN | 103051510 A | 4/2013 |
| WO | 2016107379 A1 | 7/2016 |
| WO | 2020242957 A1 | 12/2020 |

OTHER PUBLICATIONS

"Non Final Office Action Issued in U.S. Appl. No. 17/335,014", dated Jul. 18, 2022, 15 Pages.
(Continued)

*Primary Examiner* — Wing F Chan
*Assistant Examiner* — Joseph R Maniwang
(74) *Attorney, Agent, or Firm* — Newport IP, LLC; Han K. Gim

(57) ABSTRACT

Techniques are disclosed for processing data packets and implementing policies in a software defined network (SDN) of a virtual computing environment. At least two SDN appliances are configured to disaggregate enforcement of policies of the SDN from hosts of the virtual computing environment. The hosts are implemented on servers communicatively coupled to network interfaces of the SDN appliance. The servers host a plurality of virtual machines. The servers are communicatively coupled to network interfaces of at least two top-of-rack switches (ToRs). The SDN appliance comprises a plurality of smart network interface cards (sNICs) configured to implement functionality of the SDN appliance. The sNICs have a floating network interface
(Continued)

configured to provide a virtual port connection to an endpoint within a virtual network of the virtual computing environment.

20 Claims, 18 Drawing Sheets

Related U.S. Application Data on Apr. 9, 2021, provisional application No. 63/173,352, filed on Apr. 9, 2021, provisional application No. 63/173,334, filed on Apr. 9, 2021.

(51) Int. Cl.
| | |
|---|---|
| *H04L 12/46* | (2006.01) |
| *H04L 49/00* | (2022.01) |
| *H04L 67/141* | (2022.01) |
| *H04L 41/0654* | (2022.01) |
| *H04L 41/0893* | (2022.01) |
| *H04L 67/1095* | (2022.01) |
| *G06F 9/455* | (2018.01) |
| *H04L 41/0806* | (2022.01) |

(52) U.S. Cl.
CPC ...... *H04L 41/0654* (2013.01); *H04L 41/0806* (2013.01); *H04L 41/0893* (2013.01); *H04L 49/30* (2013.01); *H04L 67/1095* (2013.01); *H04L 67/141* (2013.01); *G06F 2009/45579* (2013.01); *G06F 2009/45595* (2013.01)

(58) Field of Classification Search
CPC ... H04L 49/30; H04L 67/1095; H04L 67/141; G06F 9/45558; G06F 2009/45579; G06F 2009/45595
See application file for complete search history.

(56) References Cited

U.S. PATENT DOCUMENTS

| | | | |
|---|---|---|---|
| 10,785,020 B2 | 9/2020 | Balasubramanian et al. | |
| 11,102,164 B1* | 8/2021 | Gupta | ................. H04L 41/0893 |
| 11,122,115 B1 | 9/2021 | Sagie et al. | |
| 2006/0029097 A1 | 2/2006 | Mcgee et al. | |
| 2013/0223226 A1 | 8/2013 | Narayanan et al. | |
| 2014/0098669 A1 | 4/2014 | Garg et al. | |
| 2015/0163158 A1 | 6/2015 | Ryland | |
| 2016/0241513 A1 | 8/2016 | Sridharan et al. | |
| 2016/0380899 A1 | 12/2016 | Lee et al. | |
| 2018/0287859 A1* | 10/2018 | Desigowda | ......... H04L 41/0695 |
| 2018/0367431 A1 | 12/2018 | Lai et al. | |
| 2020/0007629 A1 | 1/2020 | Tse et al. | |
| 2020/0053012 A1 | 2/2020 | Evans et al. | |
| 2020/0267051 A1 | 8/2020 | Ranjbar et al. | |
| 2020/0274828 A1 | 8/2020 | Alapati et al. | |
| 2020/0278892 A1 | 9/2020 | Nainar et al. | |
| 2020/0371842 A1 | 11/2020 | Tewari et al. | |
| 2021/0385149 A1 | 12/2021 | Suryanarayana et al. | |
| 2021/0385155 A1 | 12/2021 | Suryanarayana et al. | |
| 2022/0060569 A1 | 2/2022 | Wang et al. | |
| 2022/0086025 A1 | 3/2022 | Tewari et al. | |
| 2022/0329520 A1 | 10/2022 | Degrace et al. | |

OTHER PUBLICATIONS

Derstro, "BGP preferring routes with longer as-path prepend", Retrieved from: https://www.reddit.com/r/networking/comments/1z53cx/bgp_preferring_routes_with_longer_aspath_prepend/, Feb. 28, 2014, 5 Pages.

"International Search Report and Written Opinion Issued in PCT Application No. PCT/US22/020673", dated Jun. 2, 2022, 12 Pages.

"International Search Report and Written Opinion Issued in PCT Application No. PCT/US22/021062", dated Jun. 9, 2022, 12 Pages.

"International Search Report and Written Opinion Issued in PCT Application No. PCT/US22/021064", dated Jun. 22, 2022, 9 Pages.

"International Search Report and Written Opinion Issued in PCT Application No. PCT/US22/021066", dated Jun. 27, 2022, 16 Pages.

Yu, et al., "Fault Management in Software-Defined Networking: A Survey", In Journals of IEEE Communications Surveys & Tutorials, vol. 21, Issue 1, Sep. 6, 2018, pp. 349-392.

"NP7 Acceleration", Retrieved From: https://fortinetweb.s3.amazonaws.com/docs.fortinet.com/v2/attachments/5b863502-468b-11e9-94bf-00505692583a/fortios-hardware-acceleration-626.pdf, Retrieved Date: Dec. 29, 2020, 233 Pages.

Caulfield, et al., "Beyond SmartNICs: Towards a Fully Programmable Cloud", In Proceedings of the IEEE International Conference on High Performance Switching and Routing, Jun. 2018, 6 Pages.

Firestone, et al., "Azure Accelerated Networking: SmartNICs in the Public Cloud", In Proceedings of the 15th USENIX Symposium on Networked Systems Design and Implementation, Apr. 9, 2018, 14 Pages.

Miano, et al., "Partial Offloading of OpenFlow Rules on a Traditional Hardware Switch ASIC", In Proceedings of the IEEE Conference on Network Softwarization, Jul. 3, 2017, 9 Pages.

Moon, et al., "AccelTCP: Accelerating Network Applications with Stateful TCP Offloading", In Proceedings of the 17th USENIX Symposium on Networked Systems Design and Implementation, Feb. 25, 2020, pp. 77-92.

Subramanian, et al., "D2R: Dataplane-Only Policy-Compliant Routing Under Failures", In Repository of arXiv:1912.02402v1, Dec. 5, 2019, 17 Pages.

Tork, et al., "Lynx: A SmartNIC-driven Accelerator-centric Architecture for Network Servers", In Proceedings of the Twenty-Fifth International Conference on Architectural Support for Programming Languages and Operating Systems, Mar. 16, 2020, pp. 117-131.

"Non Final Office Action Issued in U.S. Appl. No. 17/334,997", dated Aug. 15, 2022, 15 Pages.

"Non Final Office Action Issued in U.S. Appl. No. 17/334,999", dated Aug. 11, 2022, 10 Pages.

"Final Office Action Issued in U.S. Appl. No. 17/335,014", dated Oct. 27, 2022, 15 Pages.

\* cited by examiner

SCALING HOST POLICY VIA DISTRIBUTION

This application claims the benefit of and priority to U.S. Provisional Application No. 63/173,334, filed Apr. 9, 2021, U.S. Provisional Application No. 63/173,352, filed Apr. 9, 2021, U.S. Provisional Application No. 63/173,336, filed Apr. 9, 2021, and U.S. Provisional Application No. 63/173,348, filed Apr. 9, 2021, the entire contents of which are incorporated herein by reference.

BACKGROUND

A data center may house computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

In some embodiments, the scenarios described above may benefit from the implementation of systems and methods for disaggregating policy processing off of the host machines. Disaggregation may also enable greater networking scale in order to match increasing demands from customers. In some embodiments, the SDN may implement a middle appliance, which may be referred to herein as an SDN appliance. The SDN appliance may incorporate some of the functionality of U.S. application Ser. No. 17/334,997 entitled "HARDWARE-BASED PACKET FLOW PROCESSING" filed on May 31, 2021, which is incorporated herein in its entirety In some embodiments, the SDN appliance may enable the use of the SDN control plane to manage network devices while providing high availability and fault tolerance, as further described herein. The SDN appliance provides a model to separate the application of SDN policies and configurations into a different computation environment. The operation of the SDN appliance is transparent to the virtual networks. Furthermore, the SDN appliance provides an opportunity to amortize the capabilities of the computation environment over many more virtual networks than was previously possible.

In the illustrated example embodiments, SDN capabilities may be enhanced by disaggregating policy enforcement from the host and moving it onto an SDN appliance strategically placed in the network. The SDN appliance may be configured to enforce SDN policies, perform associated transforms, and implement load balancer policies. In some embodiments, in order to move host SDN policy enforcement completely off the host, an SDN appliance including an FPGA may be used to move SDN policy enforcement off the host. Implementation of the SDN appliance can free up work/compute capability for customer workloads and enable more predictable performance. The SDN appliance can be placed in datacenters to dynamically provide for a scale or feature that may not be possible or available on the host. Such features may include VM scaling, offloading of packet processing, and flexible SDN policy application.

Disclosed herein is a data center smart rack, which may also be referred to herein as a Cloud Smart Rack, that disaggregates SDN from the host. The data center smart rack distributes connection-based management functionality into the rack in a way that maximizes network resource utilization by distributing the network resources in efficient ways. The functionality may include SDN and offloaded storage scenarios.

Disclosed herein are methods for high availability (HA) for policy-based flow forwarding. High availability (HA) schemes may be implemented for a rack-based networking appliance. The HA methods may address failure modes including losing a smartNIC in the SDN appliance and losing the appliance altogether. The techniques may include the process of synchronizing to a new appliance or smartNIC once a failure occurs.

Disclosed herein are methods for scaling host policies via distribution across multiple SDN appliances. The disclosure provides for managing oversubscription of a rack-based networking appliance. The techniques may include spreading virtual machines across the appliance so that the capabilities of the appliance can be oversubscribed efficiently.

The described techniques can allow for virtual computing environments to support a variety of configurations including custom hardware and hybrid architectures while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
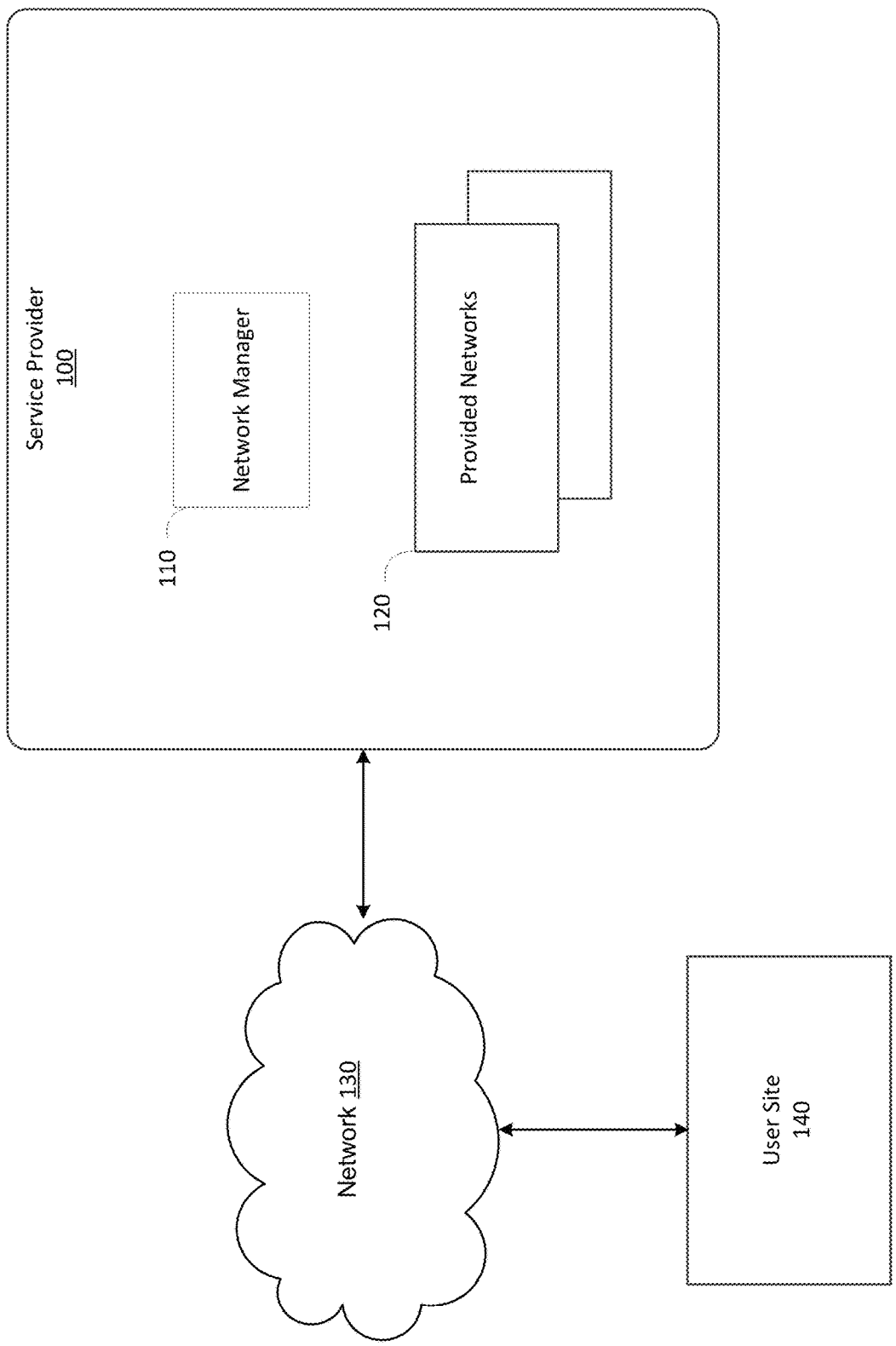
FIG. 1 is a diagram illustrating an example architecture in accordance with the present disclosure.

The disclosed embodiments enable datacenters to provide services in a manner that can reduce the cost and complexity of their networks, allowing for more efficient use of computing, storage, and network resources. Efficient implementation of the end-to-end service by a cloud service provider can enable an experience that is seamless and more consistent across various footprints. The integration of multi-tenant and single-tenant resources with a comprehensive resource management approach can minimize the overhead for the user, who will not need to address policy enforcement issues and perform other complex management tasks. The effective distribution of the described disaggregation functions can be determined based on the implications for various performance and security implications such as latency and data security.

Disclosed herein is a data center smart rack, which may also be referred to herein as a Cloud Smart Rack, that disaggregates SDN from the host. The data center smart rack may be configured to distribute connection-based management functionality into the rack in a way that maximizes network resource utilization by distributing the network resources in efficient ways. The functionality may include software defined networking (SDN) and offloaded storage scenarios. In some embodiments, an SDN appliance may be implemented that is configured to enforce SDN policies, perform associated transforms, and implement load balancer policies. In one embodiment the appliance can be located on top of the data center smart rack rather than in other locations in the datacenter.

In an embodiment, the SDN appliance may be enabled with SmartNICs. In an embodiment, the servers in the data center smart rack may deploy "skinny" NICs which may be standard NICs without SmartNIC functionality. As used herein, the term hardware acceleration device may also encompass other ways of leveraging a hardware acceleration and offloading techniques to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. In some embodiments, the peripheral device may be a network communications device, such as a network interface card (NIC). Such a NIC may be referred to herein as a smartNIC or sNIC.

In some embodiments disclosed herein, a flexible network interface may be implemented. As used herein, such a flexible network interface may be referred to as a flexible network interface card, a floating network interface card, or fNIC, or more generally as a virtual port (vport). An fNIC may be inserted on a path from the host to the destination and may be configured to apply SDN policies before arriving at the destination. In some embodiments, one or more fNICs may be implemented on an SDN appliance. The point at which the SDN policy is implemented can float between the host and the SDN appliance as appropriate to the flow.

In conventional SDN applications, application of SDN policy may be based on tuple processing. When implemented as a middle box technology such as with the SDN appliance, traffic destinations behind the middle box in need of SDN operations may be pre-programmed as a fNIC that parses traffic comprised of a combination of custom defined identifiers such as VLAN, MAC, IP, and other information to uniquely identify flows and apply appropriate policy. This layer of programmability can provide flexibility for applying policies in different networking environments and scenarios.

An fNIC associated with a virtual machine (VM) in a cloud computing network may be configured to be elastically attached and detached from a parent NIC to thereby enable the virtual machine to simultaneously be connected to multiple different virtual networks (VNets) and/or subnets that are associated with the same or different subscriptions. The fNIC may, for example, enable a service provider to inject compute instances into an existing VNet in which the data plane uses a dedicated network interface to connect the customer's VNet, while another dedicated network interface provides management plane connectivity to the service provider. Such a configuration provides data plane isolation for the customer's VNet to comply with applicable security policies without disrupting management traffic between the injected resources and the service provider. Using a cross-subscription architecture, the parent NIC may be associated with a service subscription for management traffic to the injected compute instances, for example, and an attached fNIC associated with a customer subscription for data traffic.

In addition to the isolation provided between data and management traffic to the injected compute instances, utilization of the fNIC provides additional flexibility for cloud computing customers and service providers. For example, compute instances can be simultaneously connected to different subnets (which may have different security policies) in a customer's VNet. Such capabilities provided by the fNIC may advantageously promote efficient organization and consumption of resources in the customer's enterprise.

Utilization of the fNIC can support implementation of a multi-tenant architecture to provide access by multiple tenants to a single shared VM. Each fNIC attached to a parent NIC associated with a service provider may use a unique network partition identifier (NPI) for each tenant subscription. The fNIC provides flexible implementation of multi-tenancy while enabling granular networking policies to be enforced to a particular discrete computing workload, rather than across the entire VM. A virtual filtering platform extension underlying the parent NIC may be configured to enforce specific networking policies that are tied to each fNIC including, for example, bandwidth metering, access control, VNet data encapsulation and addressing, etc. The data planes for each tenant on the VM may be operated concurrently yet are isolated from each other to ensure that data processing for one tenant has no impact on others.

The fNIC can also provide pre-provisioning of additional computing resources with associated policies that can be rapidly deployed on demand while reducing the time that is conventionally needed to inject resources into a customer's VNet. In such a "hot attach" architecture, a service provider can, for example, have a pool of already active compute instances on standby in a VM. The service can attach an fNIC to a parent NIC and associate it with the customer's subscription to provide access to the customers VNet. Management and data planes operate independently to prevent disruption while providing conformance with applicable networking and security policies.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

FIG. 1 illustrates an example computing environment in which the embodiments described herein may be implemented. FIG. 1 illustrates a service provider 100 that is configured to provide computing resources to users at user site 140. The user site 140 may have user computers that may access services provided by service provider 100 via a network 130. The computing resources provided by the service provider 100 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the user site 140.

Figure 2:
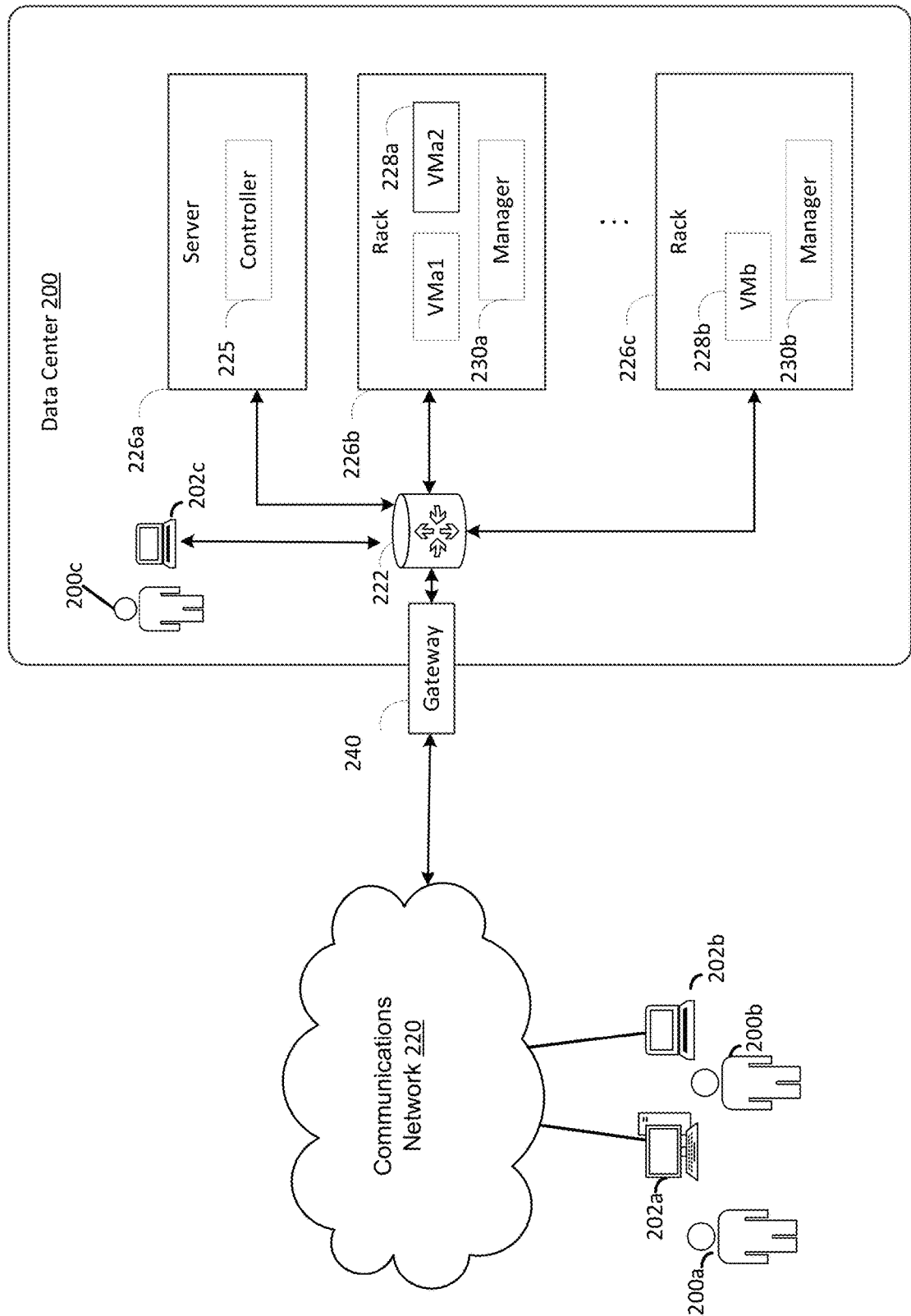
FIG. 2 is a diagram illustrating a data center in accordance with the present disclosure.

FIG. 2 illustrates an example computing environment in which the embodiments described herein may be implemented. FIG. 2 illustrates a data center 200 that is configured to provide computing resources to users 200a, 200b, or 200c (which may be referred herein singularly as "a user 200" or in the plural as "the users 200") via user computers 202a, 202b, and 202c (which may be referred herein singularly as "a computer 202" or in the plural as "the computers 202") via a communications network 220. The computing resources provided by the data center 200 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 200 may correspond to service provider 100 in FIGS. 1 and 2, or edge site 150 of FIG. 2. Data center 200 may include servers 226a, 226b, and 226c (which may be referred to herein singularly as "a server 226" or in the plural as "the servers 226") that may be standalone or installed in server racks, and provide computing resources available as virtual machines 228a and 228b (which may be referred to herein singularly as "a virtual machine 228" or in the plural as "the virtual machines 228"). The virtual machines 228 may be configured to execute applications such as Web servers, application servers, media servers, database servers, and the like. Other resources that may be provided include data storage resources (not shown on FIG. 2) and may include file storage devices, block storage devices, and the like. Servers 226 may also execute functions that manage and control allocation of resources in the data center, such as a controller 225. Controller 225 may be a fabric controller or another type of program configured to manage the allocation of virtual machines on servers 226.

Referring to FIG. 2, communications network 220 may, for example, be a publicly accessible network of linked networks and may be operated by various entities, such as the Internet. In other embodiments, communications network 220 may be a private network, such as a corporate network that is wholly or partially inaccessible to the public.

Communications network 220 may provide access to computers 202. Computers 202 may be computers utilized by users 200. Computer 202a, 202b or 202c may be a server, a desktop or laptop personal computer, a tablet computer, a smartphone, a set-top box, or any other computing device capable of accessing data center 200. User computer 202a or 202b may connect directly to the Internet (e.g., via a cable modem). User computer 202c may be internal to the data center 200 and may connect directly to the resources in the data center 200 via internal networks. Although only three user computers 202a, 202b, and 202c are depicted, it should be appreciated that there may be multiple user computers.

Computers 202 may also be utilized to configure aspects of the computing resources provided by data center 200. For example, data center 200 may provide a Web interface through which aspects of its operation may be configured through the use of a Web browser application program executing on user computer 202. Alternatively, a stand-alone application program executing on user computer 202 may be used to access an application programming interface (API) exposed by data center 200 for performing the configuration operations.

Servers 226 may be configured to provide the computing resources described above. One or more of the servers 226 may be configured to execute a manager 230a or 230b (which may be referred herein singularly as "a manager 230" or in the plural as "the managers 230") configured to execute the virtual machines. The managers 230 may be a virtual machine monitor (VMM), fabric controller, or another type of program configured to enable the execution of virtual machines 228 on servers 226, for example.

It should be appreciated that although the embodiments disclosed above are discussed in the context of virtual machines, other types of implementations can be utilized with the concepts and technologies disclosed herein.

In the example data center 200 shown in FIG. 2, a network device 222 may be utilized to interconnect the servers 226a and 226b. Network device 222 may comprise one or more switches, routers, or other network devices. Network device 222 may also be connected to gateway 240, which is connected to communications network 220. Network device 222 may facilitate communications within networks in data center 200, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 200 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 3:
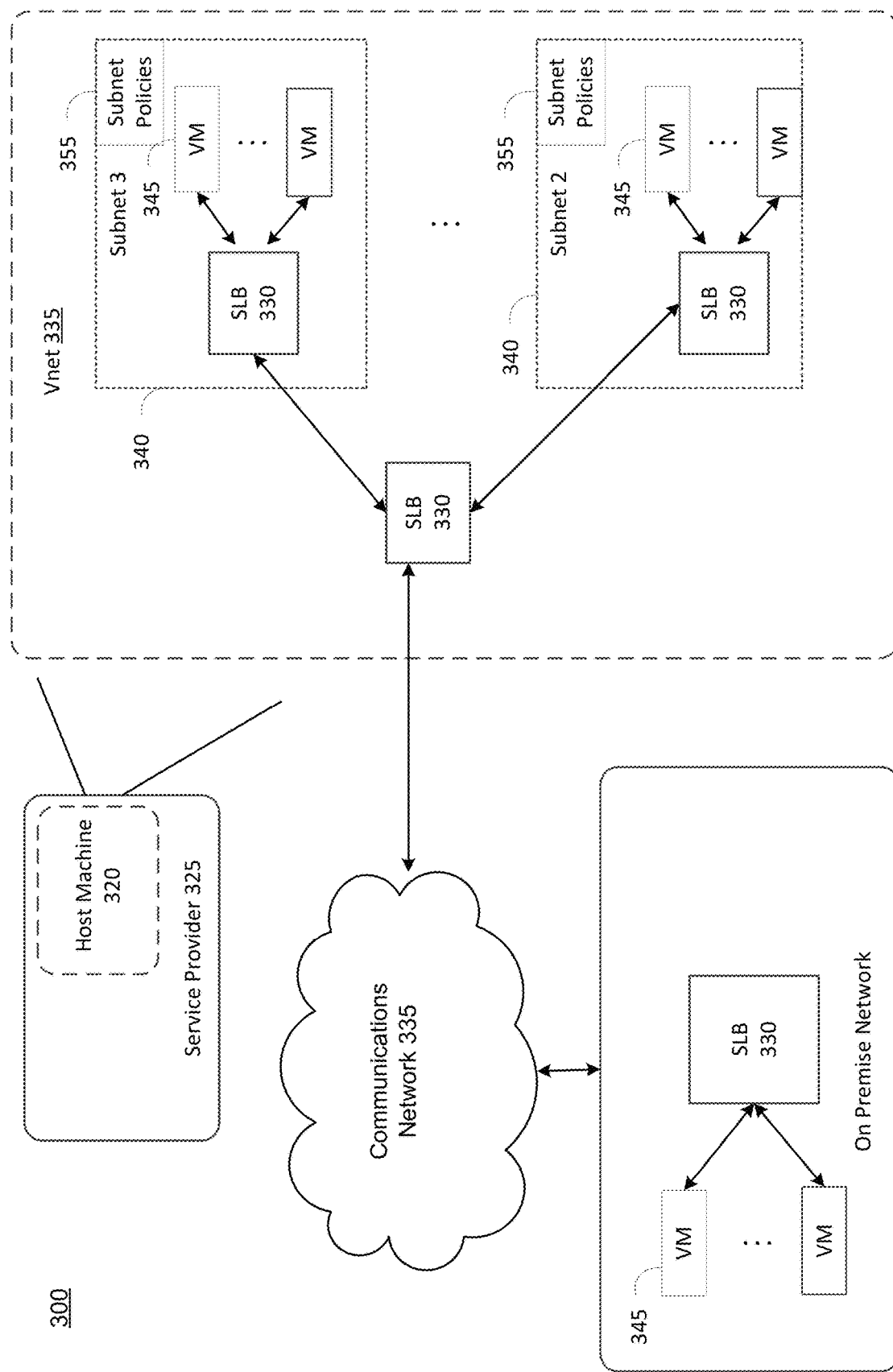
FIG. 3 is a diagram illustrating an example architecture in accordance with the present disclosure.

FIG. 3 shows an illustrative cloud computing environment 300 in which a customer network 305 includes multiple portions including an on-premises network 330 and a virtual network (VNet) 335. The customer network in this example is a hybrid network but other network configurations may also be utilized depending on the particular requirements of the user scenario. The VNet may be physically implemented using one or more host machines 320 that are operated by a cloud service provider 325. It is noted that the diagram in FIG. 3 is simplified for clarity in exposition and typical networking equipment such as firewalls, routers, and the like are not shown.

The on-premises network and VNet are typically operatively coupled using instances of gateways 330, or other networking devices, over a communication network 335 which may include, for example, private and/or public networking infrastructure using various combinations of connectivity services. The VNet may include multiple subnets 340 that each include one or more instances of virtual machines 345 that are typically connected using load balancers 350 and/or other networking devices. Security and other networking policies (collectively indicated by reference numeral 355) are typically applicable to each subnet. The networking policies are typically different for each subnet, but they can be the same and/or overlap in some cases.

Figure 4:
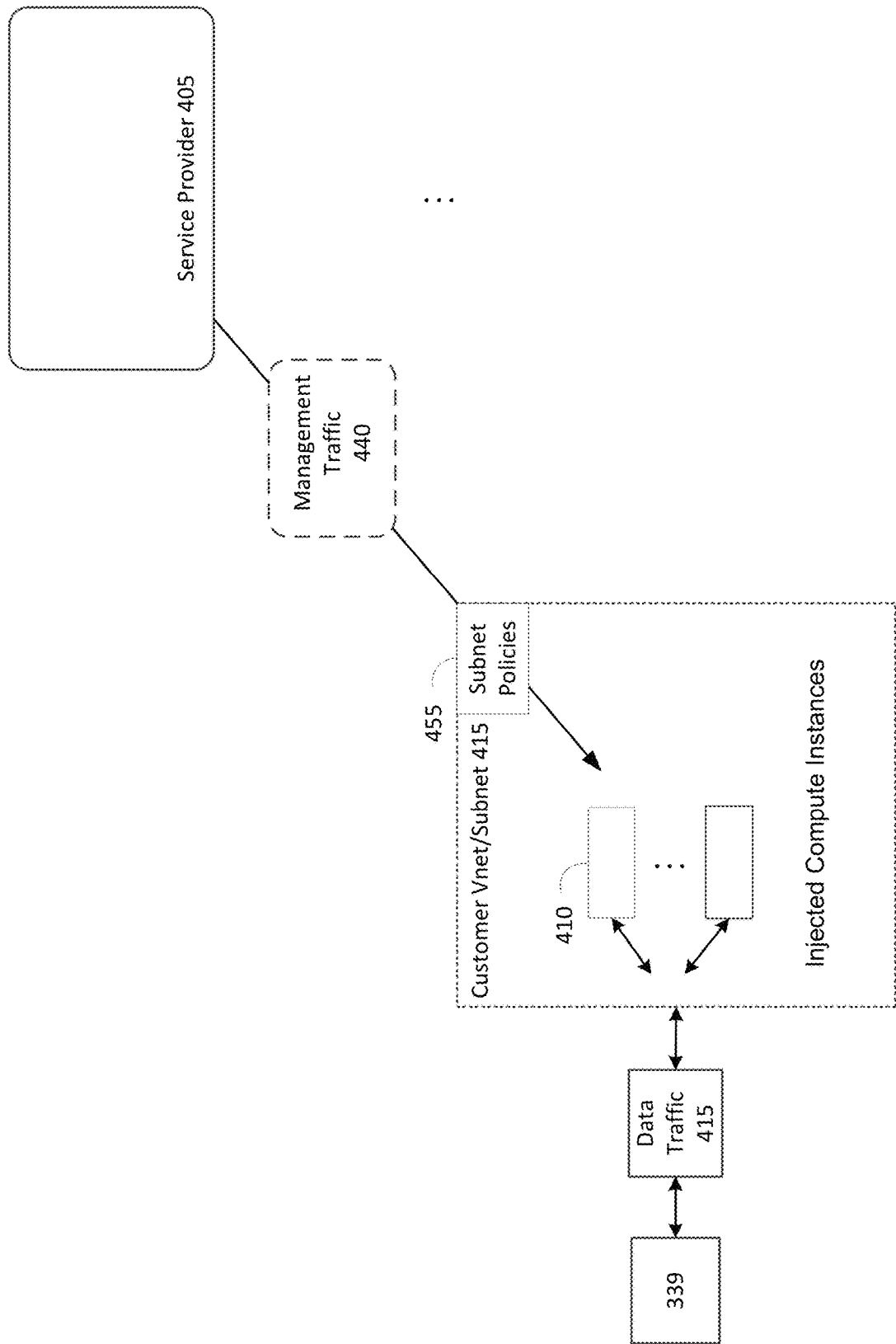
FIG. 4 is a diagram illustrating injected instances in accordance with the present disclosure.

FIG. 4 shows an illustrative service from a service resource provider 405 that injects dedicated compute instances 410 into the customer's VNet 415. For example, in some implementations, such service resource providers may be implemented using a Platform as a Service (PaaS) to provide search, content delivery, etc. The service resource provider may be associated with the cloud service provider 405 or be a third party in some cases. Service resource providers may inject compute instances or other resources into a VNet when provisioning a given cloud computing service that interacts with customer data traffic 415 that enters and exits from the gateway 330. As shown in FIG. 4, security or networking policies 455 implemented by a customer to protect a VNet or subnet are utilized to filter traffic and provide end node control at the VM/VNet/subnet for all network traffic flows.

The networking policies may block management traffic 440 by preventing management plane access from the NRP 405 which causes service disruptions. The service disruption may be addressed by an fNIC that is attachable and detachable from a parent network interface controller fNIC in an elastic manner as discussed below. The separation of management and data planes may be one characteristic of a software defined network (SDN). Thus, the customer's network 405 may be based in whole or part on SDN technologies, in some implementations, as described below.

Figure 5:
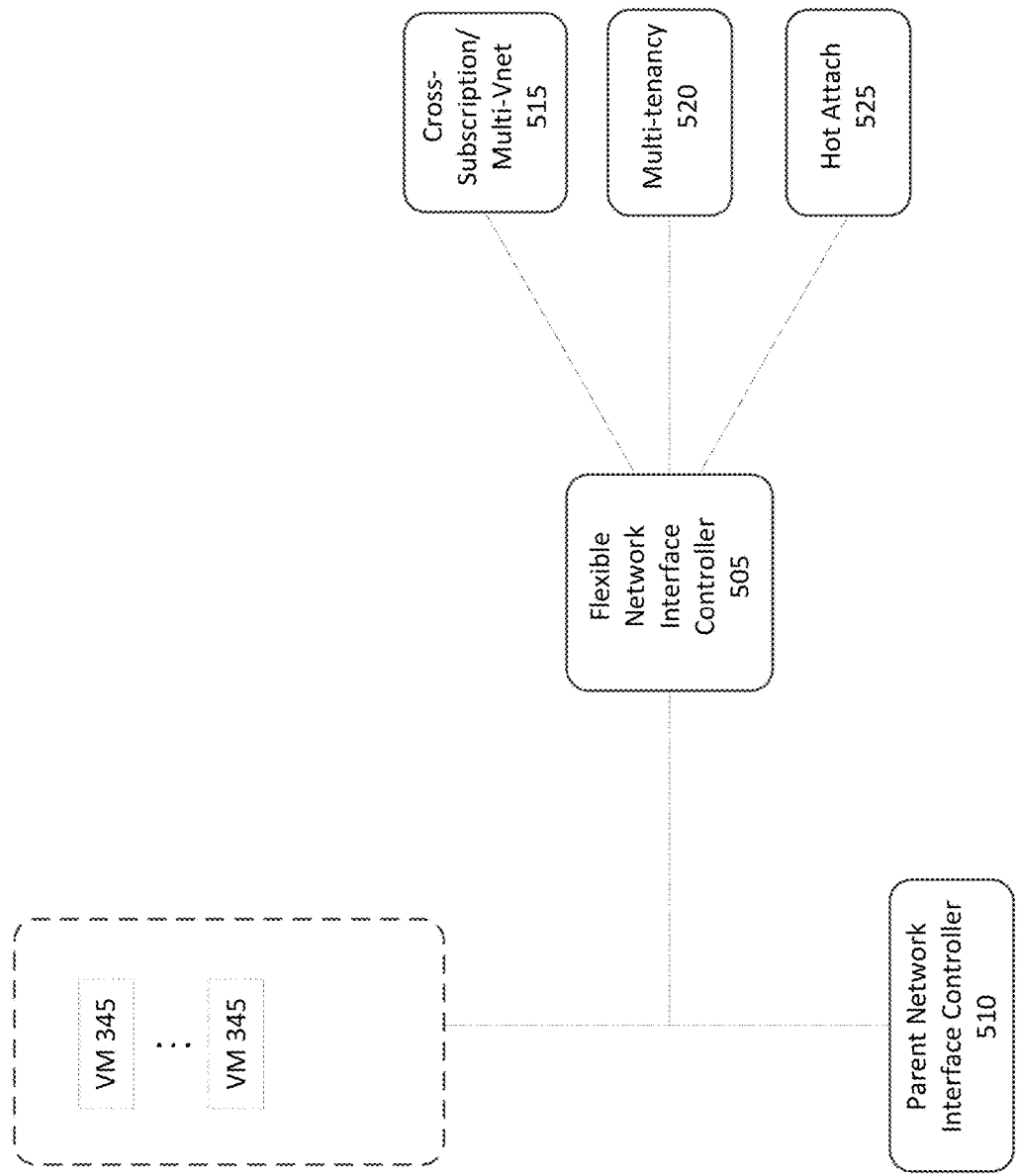
FIG. 5 is a diagram illustrating an architecture for implementing virtual services in accordance with the present disclosure.

FIG. 5 shows an illustrative fNIC 505 that may be utilized to support a variety of scenarios that is attached to a parent NIC 510. The parent NIC may be implemented in this example as virtualization of a network interface at the host supporting the VM 345 using a container model, although physical embodiments may be utilized in some scenarios.

An fNIC may be implemented using a compartment of the container as a child network interface configuration. Essentially, a compute instance may be created with a placeholder network interface such that multiple fNICs can be dynamically put up and taken down by respectively being attached and detached from the instance.

The parent NICs and fNICs provide identity, connectivity, and discoverability for the VMs in the customer's VNet. An fNIC enables flexibility for various VM deployment scenarios by its capabilities for attachment and detachment from the parent NIC. The flexibility enables rapid provisioning of a variety of cloud-computing features and services on an on-demand basis without needing to alter the fundamental workflow in a given VM/VNet/subnet while conforming with applicable networking policies.

As shown in FIG. 5, the use scenarios illustratively include, for example, cross-subscriptions and multi-VNet homing (indicated by reference numeral 515), multi-tenancy and subnet sharing 520, and pre-provisioning of resources or "hot attach" 525.

Figure 6:
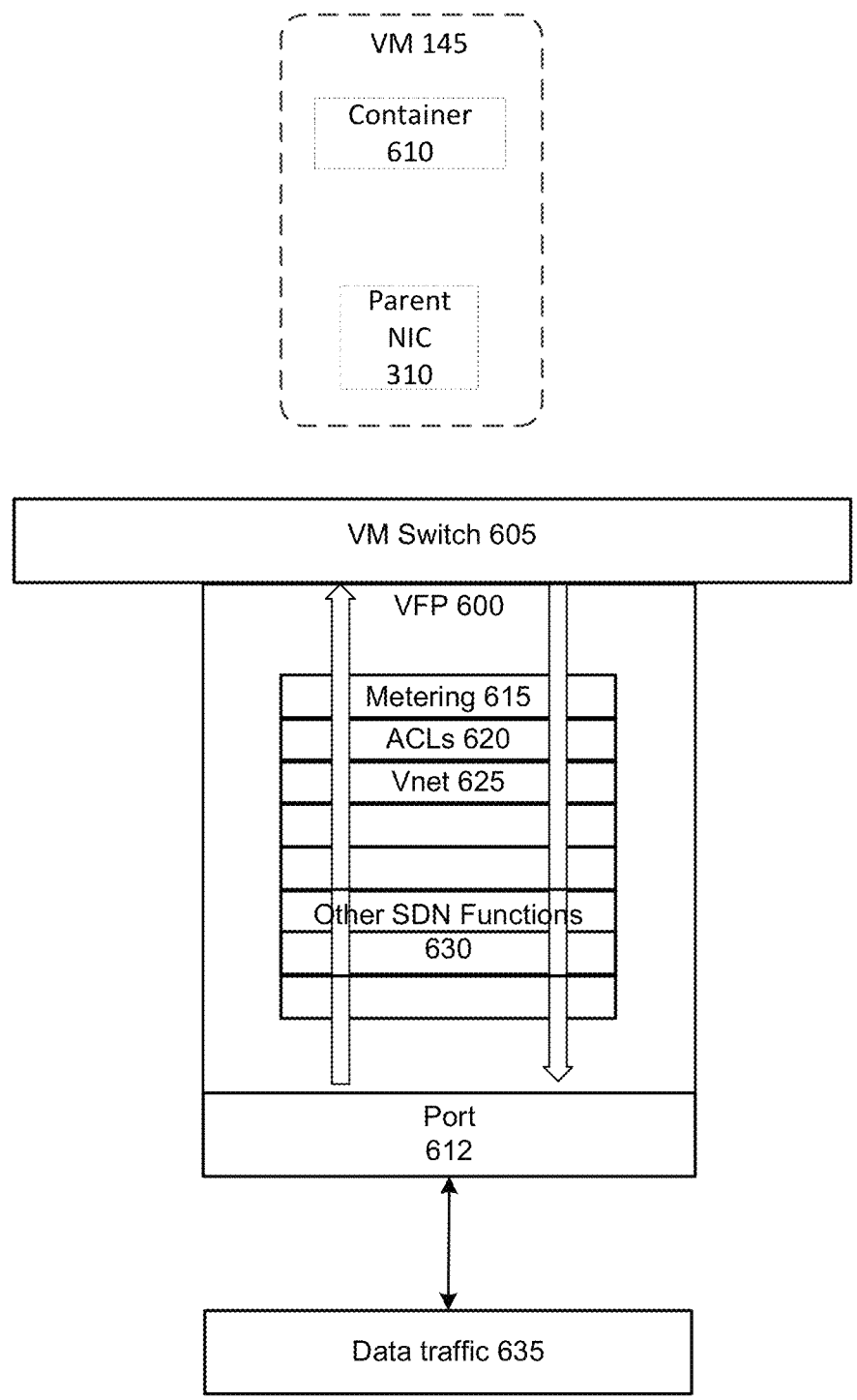
FIG. 6 is a diagram illustrating an architecture for implementing virtual services in accordance with the present disclosure.

FIG. 6 shows an example virtual filtering platform (VFP) 600 extension to a VM switch 605 that enables data path isolation in the multi-tenant architecture discussed herein by enforcing specific networking policies that are tied to each container 610 that is used to implement a parent NIC to which an fNIC is attached based on the NPI. The VM switch may logically underly the parent NIC 310 and may provide a port 612 to each VM supported by the NIC. The VFP may divide networking policies applicable to the port into layers that include rules that govern SDN behaviors and characteristics. The virtual filtering platform may provide capabilities to enforce policies and transform or tunnel data packets in a given computing workload that are entering and leaving the VM 145. The virtual filtering platform may include a central data packet processor (not shown) that performs the processing of data packets.

The networking policy layers may include those, in this example, relating to metering 615, access control lists (ACLs) 620, VNet addressing/routing 625, and other various SDN functions or features 630 which may include, for example, those pertaining to routing, tunneling, filtering, address translation, encryption, decryption, encapsulation, de-encapsulation, or quality of service (QoS). The packet processor in the VFP 600 may evaluate the packets of data traffic 635 as they traverse the networking policy layers, matching rules in each layer based on a state of the packet after an action is performed in the preceding layer. Returning packets may traverse the layers in the opposite direction and may be processed by the VFP to match the applicable rules. The rules used to express the networking policies may be entities that perform actions on matching packets (e. g., using a match action table model) as the computing workload is processed by the VFP.

In the illustrated example scenarios, SDN capabilities may be enhanced by disaggregating policy enforcement from the host and moving it onto SDN appliance strategically placed in the network.

Software defined networking (SDN) is conventionally implemented on a general-purpose compute node. The SDN control plane may program the host to provide core network functions such as security, virtual network, and load balancer policies.

Figure 7:
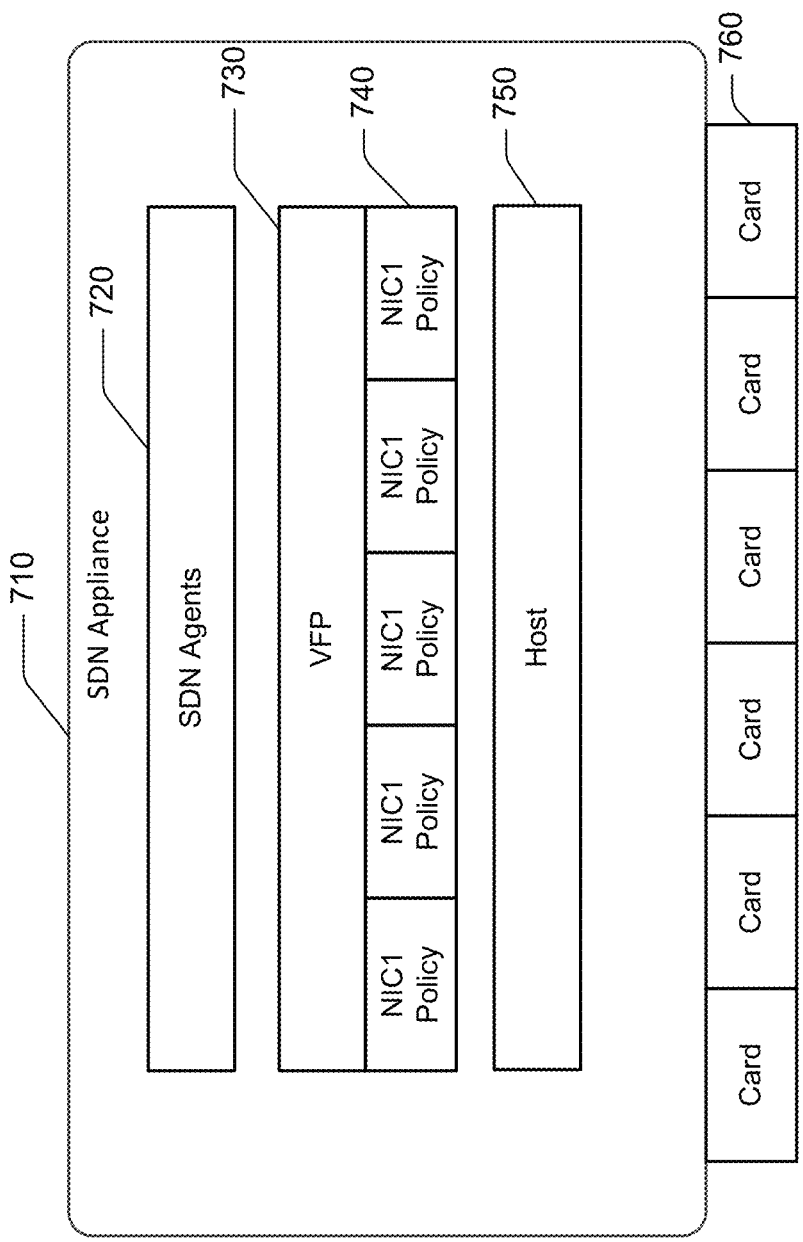
FIG. 7 is a diagram illustrating an example architecture in accordance with the present disclosure.

Referring to FIG. 7, illustrated is an example of an SDN appliance 710 that can enable disaggregation according to some embodiments. In some embodiments, the SDN appliance 710 may enable the use of the SDN control plane to manage network devices while providing high availability and fault tolerance, as further described herein. FIG. 7 illustrates one example of a network optimized chassis including SDN agents 720, a network driver capable of performing network transforms such as a virtual filtering platform (VFP) 730, policies 740, and cards (e.g., FPGAs) 750. The SKU can be change, and hosts 750 may be used as the SDN appliance if needed. The various embodiments described herein show the use of the SDN appliance as a general concept.

As described above, various embodiments include datacenter networking models that include selectively placed network hops that can apply software defined networking (SDN) policy at various points in a data center (i.e., network traversal point) before data traffic reaches their destination. This can provide improved overall performance, disaggregation from the host, and application of other SDN capabilities before the destination receives data traffic.

In an embodiment, criteria to determine where to implement the SDN policy for a flow can include, for example: age of the flow, rate of the flow, total bytes transferred on the flow, total number of flows in use at the correspondent host, and the like. Since the SDN policy applied to a flow can comprise multiple aspects, different aspects of the policy can be implemented at different locations.

In some implementations that use a rack level switch such as a top-of-rack (ToR) switch, such devices typically do not have the capability to perform transforms. An SDN appliance gateway can be used to host these agents and provide switch functionality, and can further provide transformations and connectivity. The SDN appliance can accept policies that perform transformations. In some embodiments, an agent can be implemented that programs the drivers that run on the SDN appliance. The traffic sent by workloads can be directed through the SDN appliance, which can apply policies and perform transformations on the traffic and send the traffic to the destination. In some configurations, the SDN appliance may include a virtual switch such as a virtual filtering platform.

SDN appliances can become a single point of failure for software defined networks. Mitigation of faults for SDN appliances must take into account the preservation of transient states (for example, TCP flow state) as well as the locality of the state within the individual SDN appliances. If two appliances are cross-wired to two switches, the single point of failure can be avoided from a physical device standpoint but may introduce state management and expected connectivity issues.

The described embodiments may support, for example, connected devices such as FPGAs on SDN appliances in multiple different network and physical topologies.

While FPGAs are used to illustrate the described techniques, it should be understood that the techniques may be applied to other types of connected devices such as a GPU.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
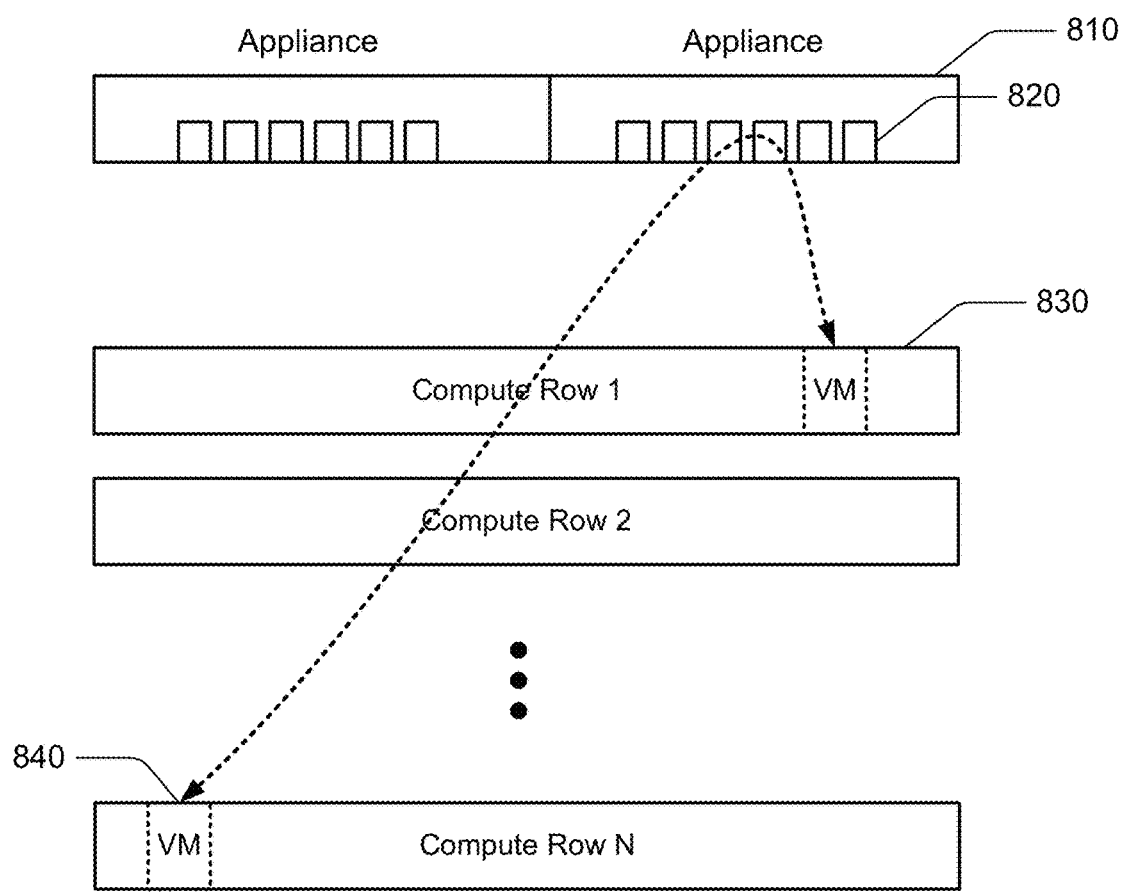
FIG. 8 is a diagram illustrating an example architecture in accordance with the present disclosure.

With reference to FIG. 8, illustrated is an example of a data center smart rack 800 with two SDN appliances 810 having one or more smart NICs 820 and a plurality of compute rows 830 having servers. Any virtual machine 840 running on any server in the data center smart rack can utilize the SDN appliance 810. For example, virtual machines with a high connections per second (CPS) or flow scale needs can send flows through the SDN appliance. The appliances may be configured to perform SDN data path functions at a significantly faster rate as compared to conventional methods.

Figure 9:
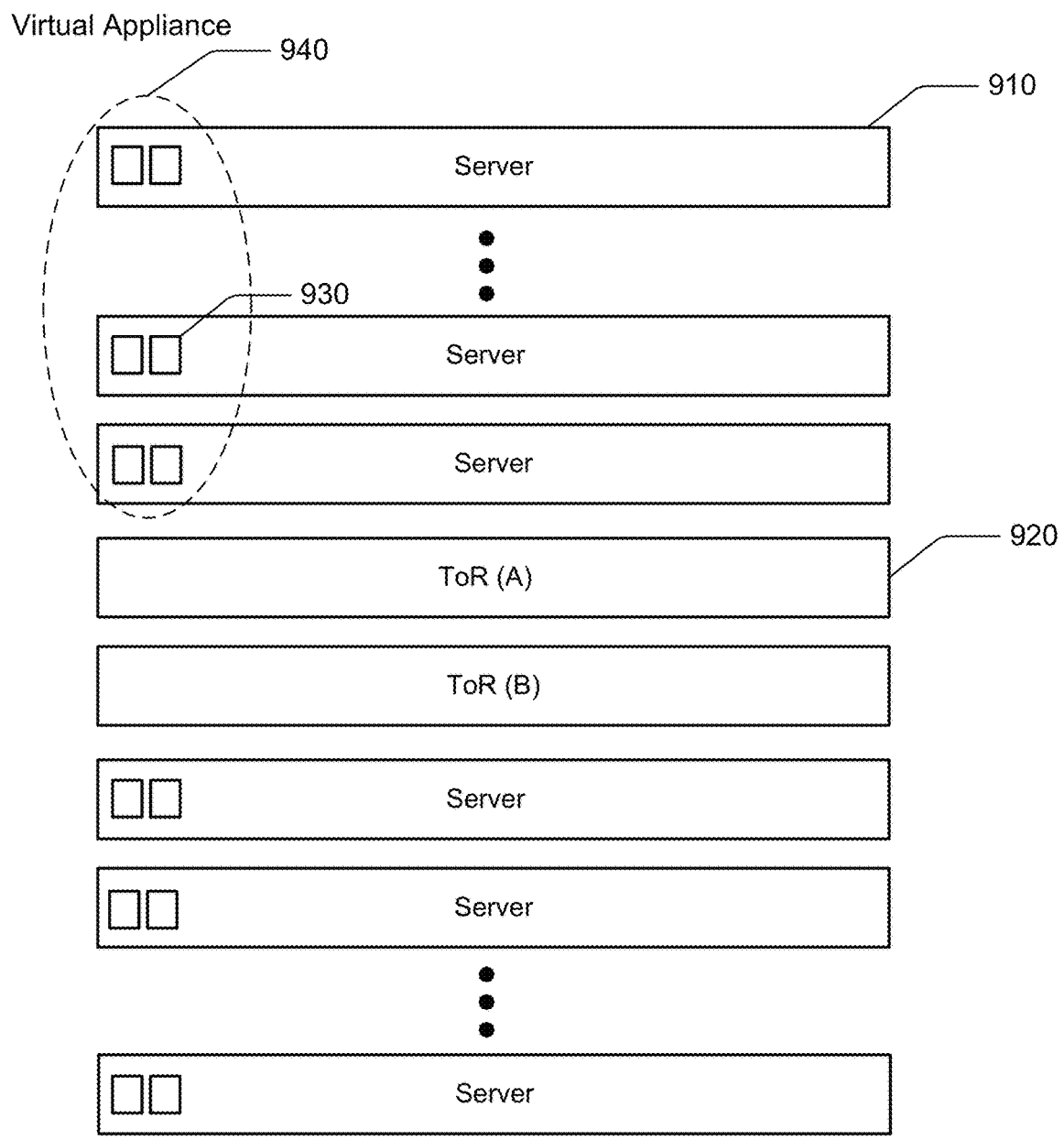
FIG. 9 is a diagram illustrating an example architecture in accordance with the present disclosure.

With reference to FIG. 9, illustrated is an example of implementing the appliance, or its components, in a virtual or distributed fashion to provide a flexible implementation approach. In other words, the components of the SDN appliance may be distributed in servers 910 rather than housed in a separate physical assembly. For example, each server 910 in the data center smart rack 900 may contain at least 2× SmartNICs 930. In an embodiment, a grouping of the SmartNICs 930 may be logically combined to form a virtual appliance 940.

Figure 10:
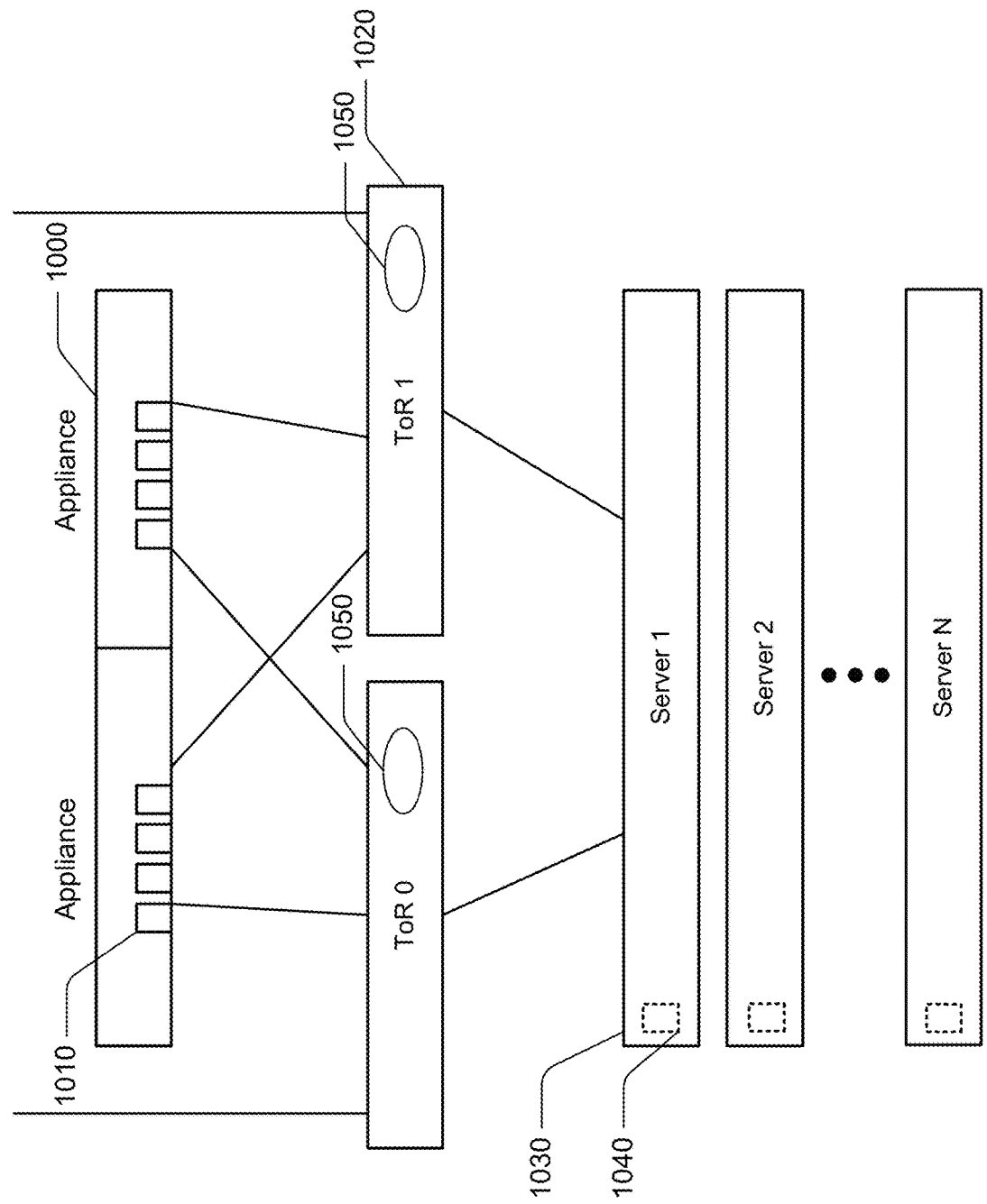
FIG. 10 is a diagram illustrating an example architecture virtual network in accordance with the present disclosure.

With reference to FIG. 10, illustrated is an example of SDN disaggregation where non-compute functionality is removed off the compute host. In one implementation, smartNICs 1010 may be pooled into shared appliances 1000. In an embodiment, the appliance 1000 may be cost optimized. The appliance 1000 may be configured to perform all SDN data path functions. In this and other figures herein, the dashed line indicates skinny NICs 1040 and the solid line indicates smartNICs 1010. The skinny NICs 1040 may be implemented on the servers 1030 for low function, cost, and low power.

In an embodiment, storage traffic may bypass the appliance. FIG. 10 illustrates an example of a fault tolerant scheme that is resilient to ToR or appliance failure. Each appliance 1000 is cross-connected to each ToR 1020. In an embodiment, two appliances may use connection state replication. In one example, 2-4 SmartNICs 1010 per appliance may be implemented depending on the load. In an embodiment, each ToR 1020 may be fully connected to every SmartNIC 1010. For example, each SmartNIC 1010 may provide two redundant 100G bump-in-wire SDNs. The illustrated example allows for hot insertion/deletion/RMA of NICs. The servers 1030 may have dual ported skinny NICs 1040. In this embodiment, storage traffic does not transit the SmartNIC (storage bypass). In an embodiment, SDN agents 1050 may execute on the server or ToRs.

Figure 11:
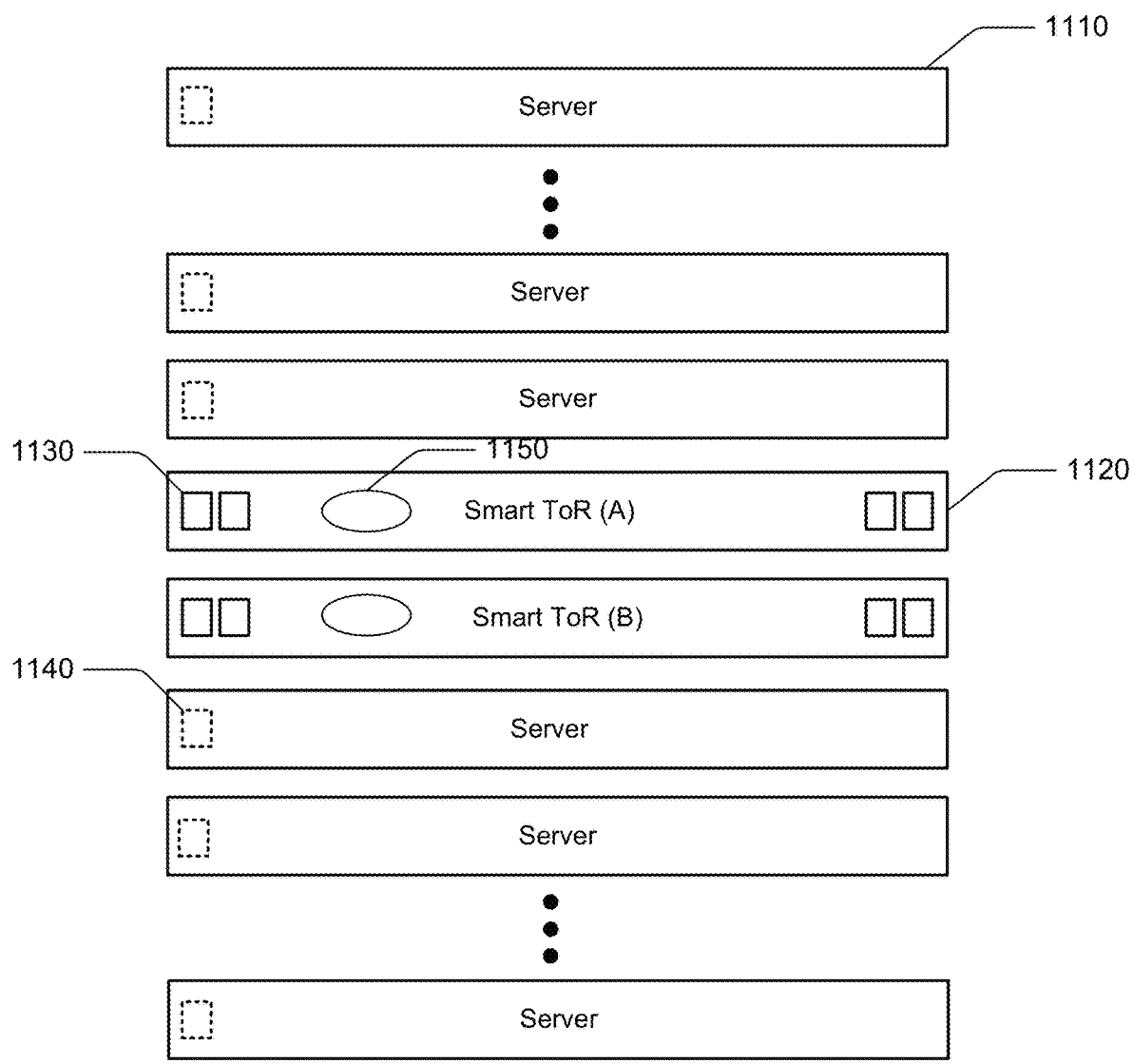
FIG. 11 is a diagram illustrating an example architecture virtual network in accordance with the present disclosure.

With reference to FIG. 11, illustrated is an embodiment of a data center smart rack 1100 where smartNICs 1130 are distributed into smart TORs 1120 (e.g., SONiC-based ToRs).

The illustrated example may provide the same data center smart rack appliance functionality with storage bypass. In an embodiment, the smartToR 1120 may include a switch and SmartNICs 1130. In one implementation, SmartToRs 1130 may be interconnected similar to the data center smart rack shown in FIG. 10 by exposing NIC ports. In this implementation, the rack may be mechanically and board optimized with fewer connectors and boards. In one embodiment, servers 1110 may each have one skinny NIC 1140. In an embodiment, SDN agents 1150 may execute on the server or ToRs.

Figure 12A:
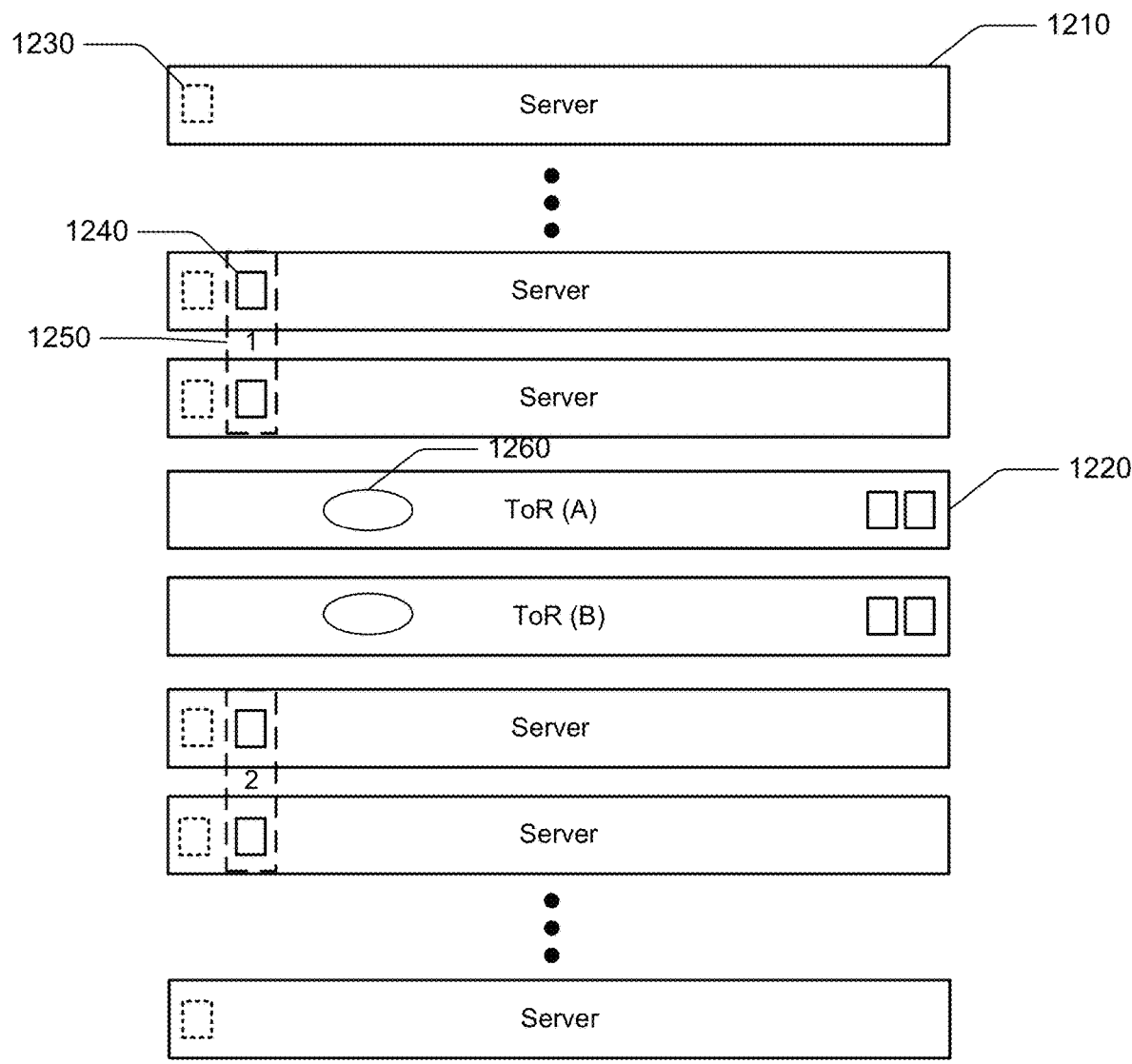
FIG. 12A is a diagram illustrating an example architecture in accordance with the present disclosure.

With reference to FIG. 12A, illustrated is another embodiment of a data center smart rack 1200 with distribution of smartNIC's 1240 among the servers 1210 to create a distributed and virtual appliance. This example may be similar to the SDN functionality with storage bypass. This embodiment eliminates a physically separate SDN appliance by adding SmartNICs 1240 inside the servers 1210, creating virtual appliances 1250 with N number of smartNICs (2 in this example). Most or all of the servers 1210 may further have one skinny NIC 1230. The ratio may be determined based on performance needs (e.g., a ratio of 3:1). In an embodiment, SDN agents 1260 may execute on the server or ToRs.

Figure 12B:
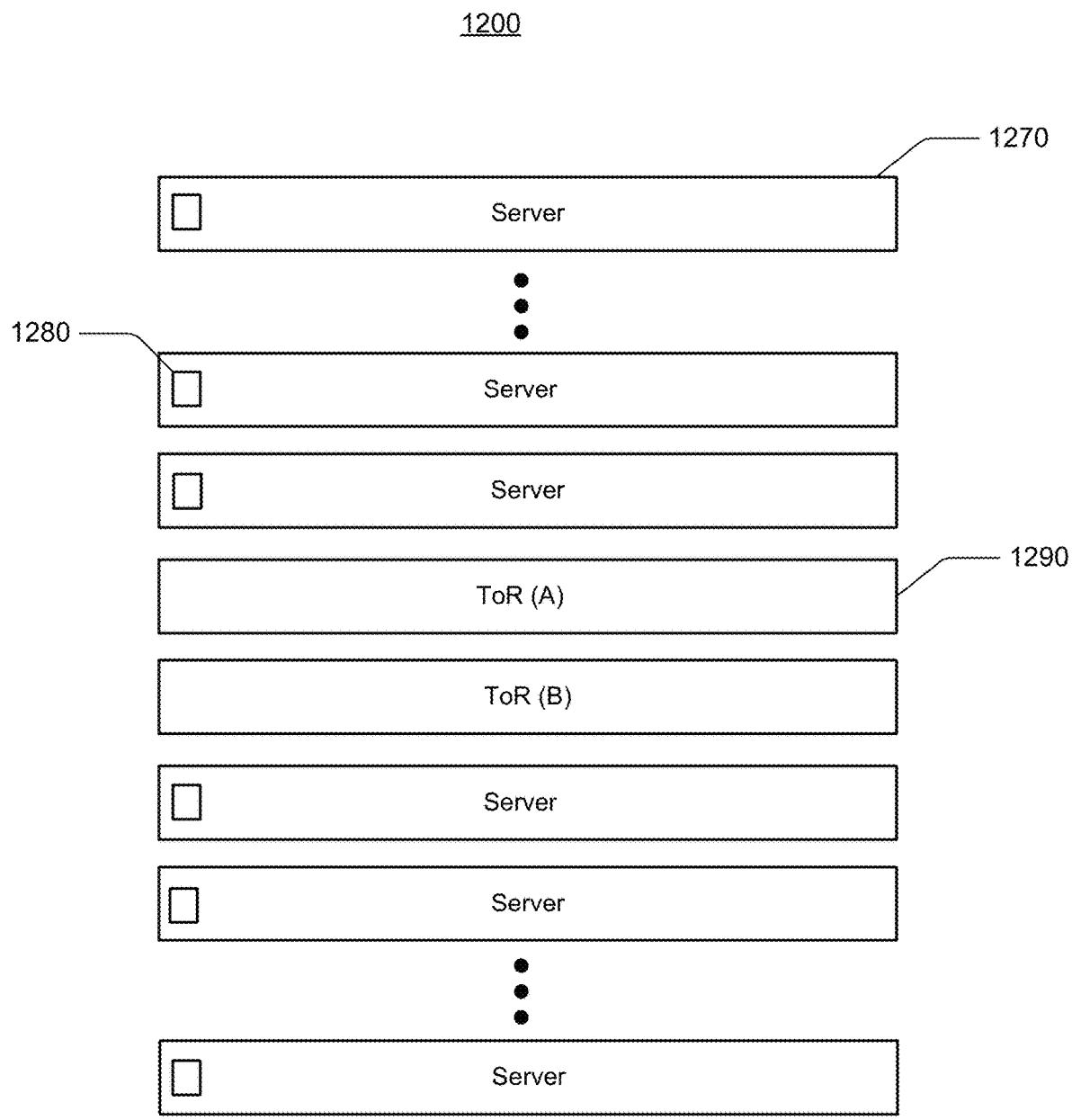
FIG. 12B is a diagram illustrating an example architecture in accordance with the present disclosure.

With reference to FIG. 12B, illustrated is another embodiment of the data center smart rack 1200 with distribution of smartNIC's 1280 among the servers 1270 to create a distributed and virtual appliance. In some embodiments, a virtual appliance may be implemented in a bare metal server scenario. This embodiment also eliminates a separate SDN appliance by adding SmartNICs 1280 inside the servers 1270, where N servers are each configured with a smartNIC to form a virtual appliance with N number of smartNICs. In some embodiments, such a configuration may be used to support 5G edge applications.

Figure 13:
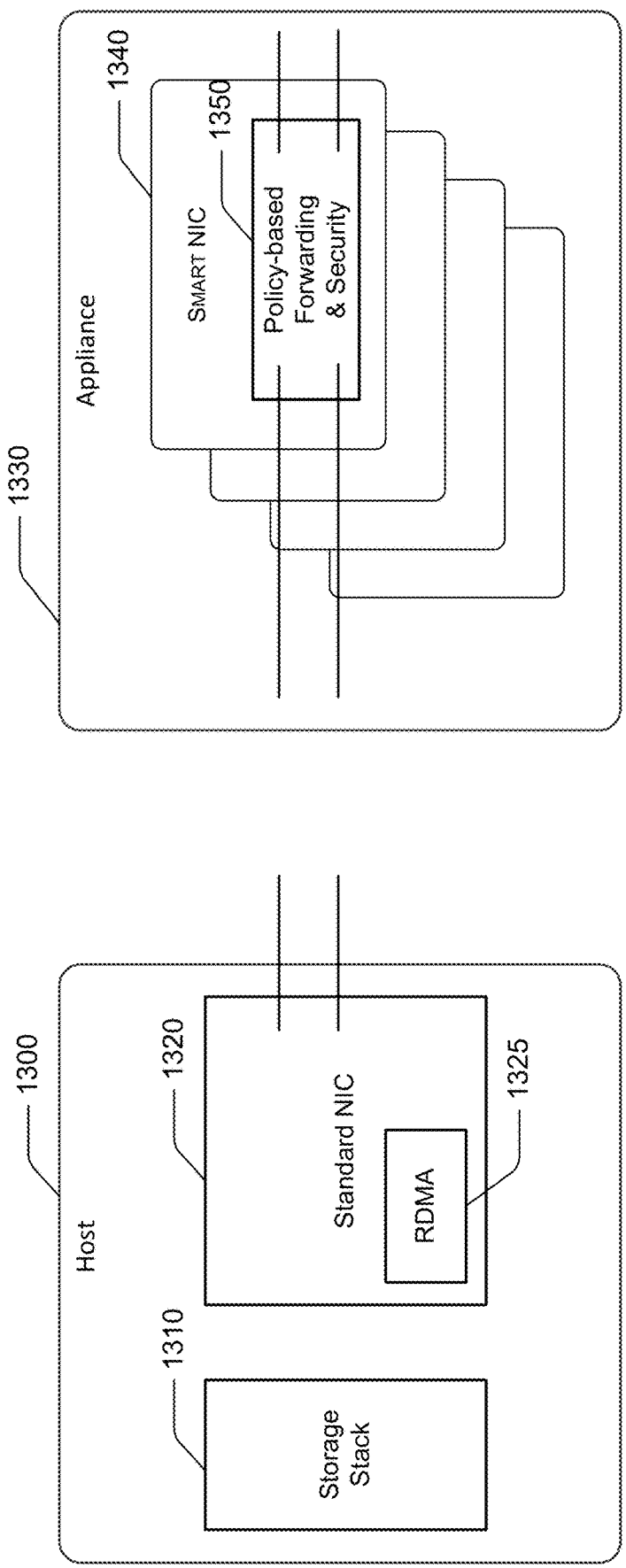
FIG. 13 is a diagram illustrating an example architecture in accordance with the present disclosure.

With reference to FIG. 13, the left side of the figure shows a skinny or standard NIC 1320 that provides RDMA offload functionality 1325 and connectivity to the appliance. Networking traffic may be tunneled to the appliance 1330. The right side of the figure shows stateful network policy-based forwarding and security 1350 performed on SmartNICs 1340.

Disclosed herein are techniques for high availability (HA) for policy-based flow forwarding. High availability (HA) schemes may be implemented for a rack-based networking appliance as disclosed herein. Failure modes that may be addressed by the HA schemes include losing a smartNIC in the appliance and losing the appliance altogether. The techniques include the process of synchronizing to a new appliance or smartNIC once a failure occurs.

In an embodiment, high availability may be achieved via the following concepts:
  Active-Passive architecture with two (2) SDN appliances
  Overprovisioning—same ENI handled by multiple appliance smartNICs
  Pairing—each sNIC from one SDN appliance will have "paired" card in second SDN appliance, with shared/same VIP Disclosed herein is a scaling host policy via distribution across multiple SDN appliances. Techniques are described for managing oversubscription of a rack-based networking appliance. The techniques include spreading virtual machines across the appliance so that the capabilities of the appliance can be oversubscribed efficiently.

In an embodiment, scaling may be achieved via the following concepts:

Overprovisioning—the same ENI handled by multiple appliance sNICs, each sNIC with a different VIP Flow splitting—TOR (or source node) splitting traffic equally across different VIPs For high availability, one goal may be to have zero downtime planned failover, and <2 sec downtime unplanned failover. Additionally, another goal can be the ability to resume connections in the event of both unplanned and planned failover. The high availability scheme may be implemented such that if the appliance receives a valid packet, the appliance does not drop the packet due to flow replication delays. A further objective can be to ensure that both inbound and outbound packets take the same appliance for a given flow.

Figure 14:
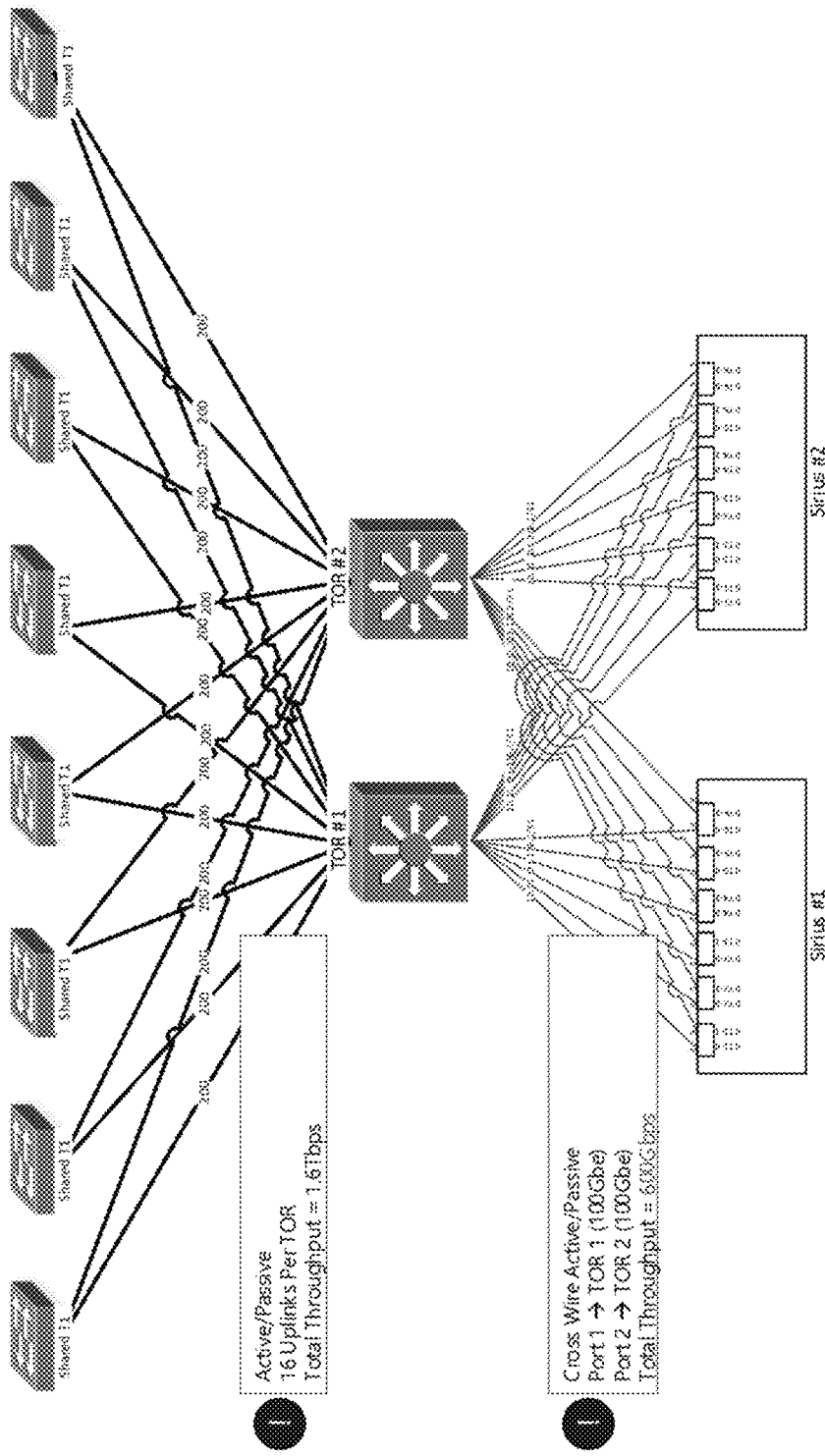
FIG. 14 is a diagram illustrating an example architecture in accordance with the present disclosure.

FIG. 14 shows an example of a high-level architecture of rack design for high availability and scale. This example illustrates active/active hardware design and active/passive ENI design (software). FIG. 14 illustrates an embodiment with two TORs with a cross-wire design. Each sNIC may be connected to both TORs for availability and scale.

Both SDN appliances may be available in case of a single TOR failure. Some ENIs may be "Active" on SDN Appliance 1, and "Passive" on SDN Appliance 2. Other ENIs are "Active" on SDN Appliance 2 and "Passive" on SDN Appliance 1

Both SDN Appliances may be used for traffic. In an embodiment, each SDN Appliance may be provisioned up to a set threshold of capacity (to allow for failovers). For example, 80% may be used. If full throughput redundancy is desired, then the appliances may be run at 50%.

The described techniques provide a scheme where a single TOR failure does not impact the overall connection rate.

Figure 15:
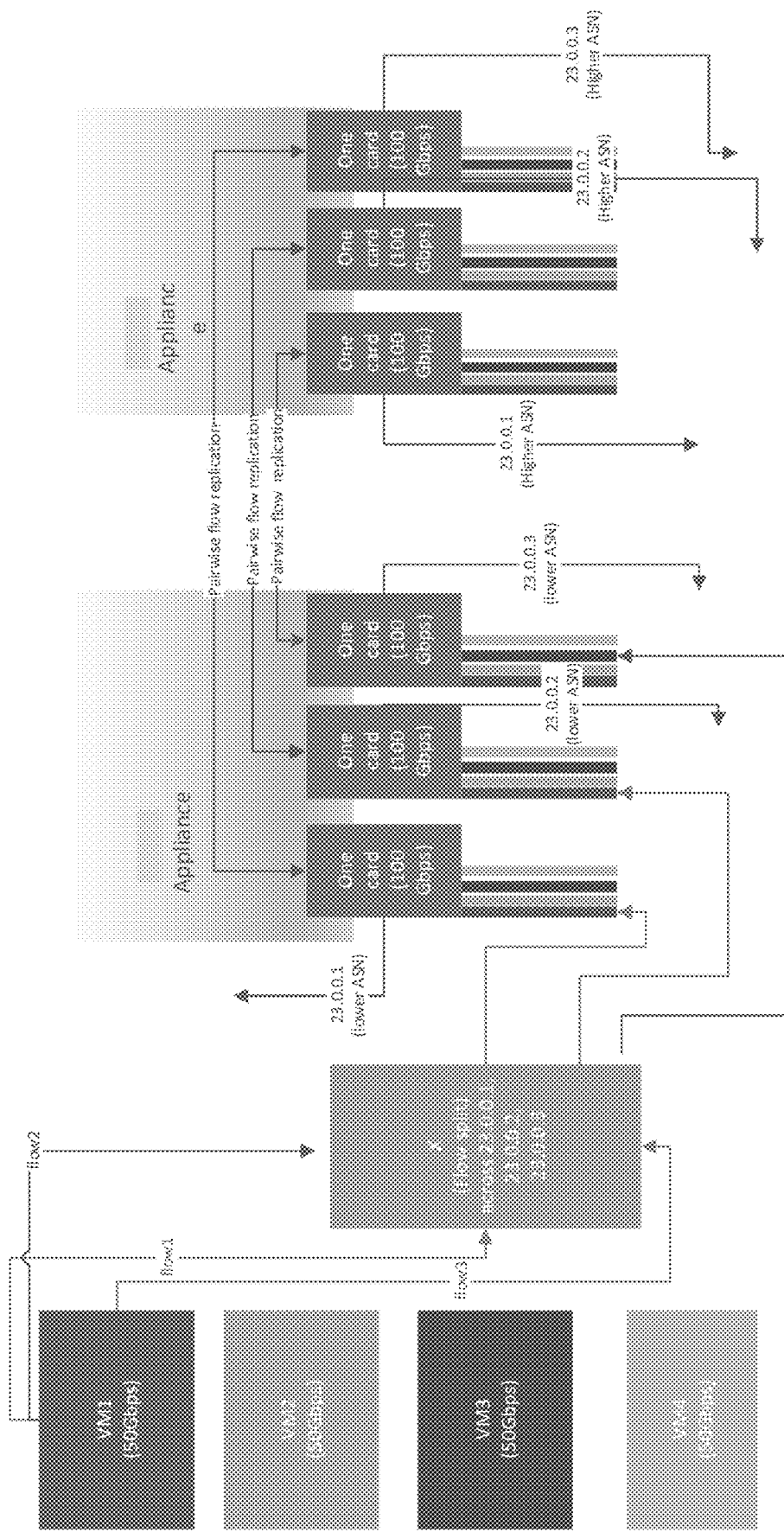
FIG. 15 is a diagram illustrating an example architecture in accordance with the present disclosure.

FIG. 15 shows an example of traffic flow in a highly available and scalable appliance set. In an embodiment, ENIs from a single VM may be provisioned on multiple sNICs on the same SDN appliance. For example, a sNIC from SDN Appliance 1 may be paired with a sNIC from SDN Appliance 2 (where each sNIC participates only in single pairing relationship). Pairwise flow replication may be provided. A single sNIC may handle multiple ENIs.

Some ENIs on the same sNIC may execute operate in an active mode, and some other ENIs on the same sNIC may operate in a passive mode.

Each sNIC may have two VIPs: one VIP announced with short path thru BGP (used by ENIs in "Active" mode), and a second VIP announced with longer path thru BGP (used by ENIs in "Passive" mode). Paired sNICs may announce the same set of VIPs.

The configuration may include ENI-based (not card based) flow replication (direction of flow replication: "Active ENI"→"Passive ENI").

A single ENI may be programmed on multiple sNICs (each sNIC with a different VIP).

The TOR (or source node where VM is located) may perform traffic load balancing/splitting/sharding for a selected ENI across VIPs of the sNICs on which this ENI is provisioned.

High Availability Architecture

Active-Passive Model

The Active-Passive model may ensure high availability in case either (1) one of the TOR/SDN Appliance fails or otherwise becomes unavailable, or (2) a single sNIC fails or otherwise becomes unavailable.

Setup Details

Each sNIC from "SDN Appliance 1" may have a "paired" sNIC from "SDN Appliance 2"

"Paired" sNICs can serve the same ENI with the exact same policies setup on each "Paired" sNICs may continuously replicate active flows from the Active sNIC to Passive sNIC Both sNICs may announce the same VIP via BGP "SDN Appliance 1" may be in Active mode (announcing preferred, shorter path to itself thru BGP)

"SDN Appliance 2" may be in Passive mode (announcing less preferred, longer path to itself through Border Gateway Protocol (BGP))

Normal Traffic Pattern

Normal traffic pattern for ENIs handled by sNICs may go through "SDN Appliance 1" (Active).

Failure Mode

In case of failure, BGP may route from "SDN Appliance 1" (previously active) which may be withdrawn and the TOR may switch to "SDN Appliance 2" and redirect traffic there, ensuring continuous traffic and an uninterrupted customer experience.

Pairing

SNICs between "SDN Appliance 1" and "SDN Appliance 2" may be paired with each other to create the described "Active-Passive" model.

In an embodiment, the control plane may be responsible for creating "pairing" relationship between sNICs—select which sNICs create a pair.

ENI Policy Configuration

"Paired" sNICs may be configured (by the control plane) with the same ENI and same policy.

The control plane may be responsible for configuring the same ENI and same policy across both paired sNICs. Replication of ENI policy may not be required by the sNIC as it is handled by the control plane.

Flow Replication

Once the "pairing" relationship is established, flows may start being replicated and synced. SNICs may be responsible for replicating and syncing flows across sNICs in the "paired" relationship.

In case of outage (e.g., the entire SDN appliance is not available for a longer period of time), the pPairing" relationship might be changed by the control plane.

In this case the control plane can:

Withdraw the "pairing" relationship from sNIC (unpair the sNIC)

Establish a new "pairing" relationship to another sNIC (pair different sNIC)

The original sNIC (which is currently in the active state) may continue to receive traffic when the pairing relationship changes.

Once the new pairing is established, the flow transfer/sync can start. The new sNIC may become "passive" from the point of view of traffic and to ensure that no outage happens, the new sNIC should not become "active" until all flows are fully synced with the original sNIC.

Overprovisioning

The same ENI may be handled by multiple sNICs

Scalability

Overprovisioning and flow splitting can allow for high CPS as well as high bandwidth for customers, as all the connections will be distributed across multiple sNICs. In various embodiments, a different number of sNICs may be provisioned depending on customer needs for scale.

Overprovisioning

A single ENI may be provisioned on multiple sNICs in a single SDN appliance. The same policy (with exemption of sNIC VIP which will different) may be setup on each sNIC. Each sNIC may announce a different VIP.

The TOR (or source side) may be configured for splitting (spreading) traffic going through SDN appliances across multiple VIPs to ensure traffic is equally distributed across all the overprovisioned sNICs.

In addition, for the purpose of high availability (as described above), the same ENI may also be setup on "paired" sNICs on the secondary SDN appliance.

Flow Splitting

The objective of flow splitting is to ensure that ECMP or any other mechanism will ensure that any set of flows that were active and synced actually end up on the passive node, and to avoid ECMP or other mechanisms from landing a different set of flows that are already synced.

Flow splitting may be performed by an intelligent TOR, directly on a source based on stable hashing, or directly on the source node (where the VM is).

As a single ENI will be handled by multiple VIPs (over-provisioned)—ex. 23.0.0.1, 23.0.0.2, 23.0.0.3, the TOR may equally rewrite the destination address to ensure a similar outcome as in the "ECMP" protocol (with additional explicit destination address rewrite).

Scenarios

Single TOR Failure—Single TOR Becomes Inaccessible

How Traffic Pattern Changes

The SDN appliance behind this TOR is still accessible through the second TOR. There may be a loss of 50% bandwidth, and no loss of CPS. The second TOR must now handle double the bandwidth and double the CPS. Assuming the sNIC is actually the bottleneck for CPS (not TOR), there is no CPS loss, the only impact is on bandwidth.

The TOR becomes the bottleneck for bandwidth and CPS

Both SDN Appliances are still operating at 100% capacity

By splitting the load across multiple sNICs, there is only a loss of 50% of the connections from the sNIC that failed, and not the entire load of the VM.

Single Link Failure—Single Link Between TOR and Single sNIC Becomes Unavailable

How Traffic Pattern Changes

The sNIC is still being served by the link to the second TOR.

There may be a loss of 50% bandwidth to that sNIC as a single connection is used for both ingress and egress No Impact on CPS By splitting the load across multiple sNICs there is only a loss of 50% of the connections from the sNIC that failed, and not the entire load of the VM.

Single sNIC Failure

Single sNIC becomes unavailable

This sNIC was set up as "active" for some ENIs and "passive" for other ENIs

This sNIC no longer serves traffic for "active" ENIs

How Traffic Pattern Changes

This sNIC no longer announces its own VIPs via BGP

Longer route for same VIP is used by TORs

"Paired" sNIC becomes "active" for all ENIs (it was already "active" for some ENIs, and "passive" for other ENIs, now the "passive" ENIs are becoming "active")

ENIs served by this sNIC reduces utilization from 80% each→50% each (loss of ⅜th or 37.5% capacity per sNIC). This assumes that the original sNIC was allocated up to only 80% (to allow for failover). This number can be adjusted.

Considering that a single ENI is load balanced across multiple sNICs, other sNICs are not affected and the actual capacity reduction (bandwidth+CPS) is much lower than 30%. Assuming 5 sNICs are allocated per ENI, loss of a single sNIC reduces capacity by 7.5%.

Previously: 100%, 100%, 100%, 100%, 100%=100% capacity

Now: 62.5%, 100%, 100%, 100%, 100%=92.5% capacity

What Happens Next

If the outage of the single sNIC persists, the control plane may select a different sNIC on another SDN Appliance (SDN Appliance 3) and initiate pairing with that sNIC. A backup and "empty" SDN Appliance may be provided to handle this scenario.

Flow sync may start between sNIC currently processing traffic (half of "active" ENIs) and a new sNIC may be added to the pairing relationship. Once flow sync completes for all ENIs, the newly paired sNIC may start to announce its VIP as "active" (with a shorter BGP path).

Traffic switches again to the new sNIC, as it is primary.

Capacity is fully restored.

Single SDN Appliance Failure (all sNICs on that Appliance)—all sNICs on that Appliance Become Inaccessible How Traffic Pattern Changes Each sNIC was paired with other sNIC from the second SDN Appliance The second SDN appliance becomes active for all ENIs Capacity is reduced (both bandwidth and CPS)

What Happens Next

If the outage persists, the control plane removes the existing pairing relationship, allocates a new SDN appliance, and creates a pairing relationship with that new SDN appliance.

Flow Replication Using Perfect Sync

Perfect Sync provides consistent synchronization of flows between paired sNICs as those sNICs are active and receiving new connections is important.

The algorithm below allows for consistent state replication between a pair of the sNICs during the sync process after a pairing relationship is established, re-established, or recovered.

Prerequisites

The following examples use colors to represent connections/flows when a pairing fails. However, it should be understood that other methods can be used, such as using time stamps or another indication that can be used to associate flows with pairings such as flags, bit patterns, and so forth.

There are at least 2 colors (suggested: 8 colors represented by 3 bits)

All connections/entries in the flow table are colored

A pairing relationship is established between two sNICs (primary sNIC and secondary sNIC)

There exists a way to replicate connection (entry in a flow table) to a paired device.

Algorithm:

When a sNIC comes online, it chooses a color ("Color A")

As the sNIC starts receiving traffic it creates new flows (creates entries in flow table)

New flows are added to the flow table with the chosen color ("Color A") and immediately replicated to the paired device (colors do not get replicated)

All connections/flows use the same color until the pairing fails, and continues using the color if there is no active pairing When pairing is re-established, the device "changes" color to new color ("Color B")

New flows are added to the flow table using the new color ("Color B") and immediately replicated to paired device (colors do not get replicated).

Device starts replicating (synchronizing) existing connections (the new device to which either a new pairing was created or the existing device to which pairing was re-established)

Synchronization method replicates only connections (entries in the flow table) which have a color that is different the actively used color (different than "Color B")

Entries with the currently active color ("Color B") are not replicated via the synchronization algorithm, as they are replicated in real-time (immediately as they are created).

Algorithm finishes. Flow replication has been completed.

The above algorithm ensures two synchronizations are occurring in parallel:

Real-time immediate synchronization of new changes (which will remain active after "Perfect Sync" is completed)

Synchronization of existing connections (occurring during "Perfect Sync")

As the synchronization is occurring, new connections as well as changes in the state of existing connections (irrespective of color) are replicated immediately in real-time (outside of the synchronization algorithm).

It is possible that a connection will end (FIN) and will result in the primary sNIC removing a flow and immediately sending the new connection state change to close the connection to a paired device (before the existing connection was even journaled/synchronized to the paired device). To deal with this possibility on the paired device side, if the connection does not already exist in its table, then this update message should be ignored.

When pairing is re-established, the secondary sNIC may empty the entire state of the flow table to allow it to receive a clean state.

Figure 16:
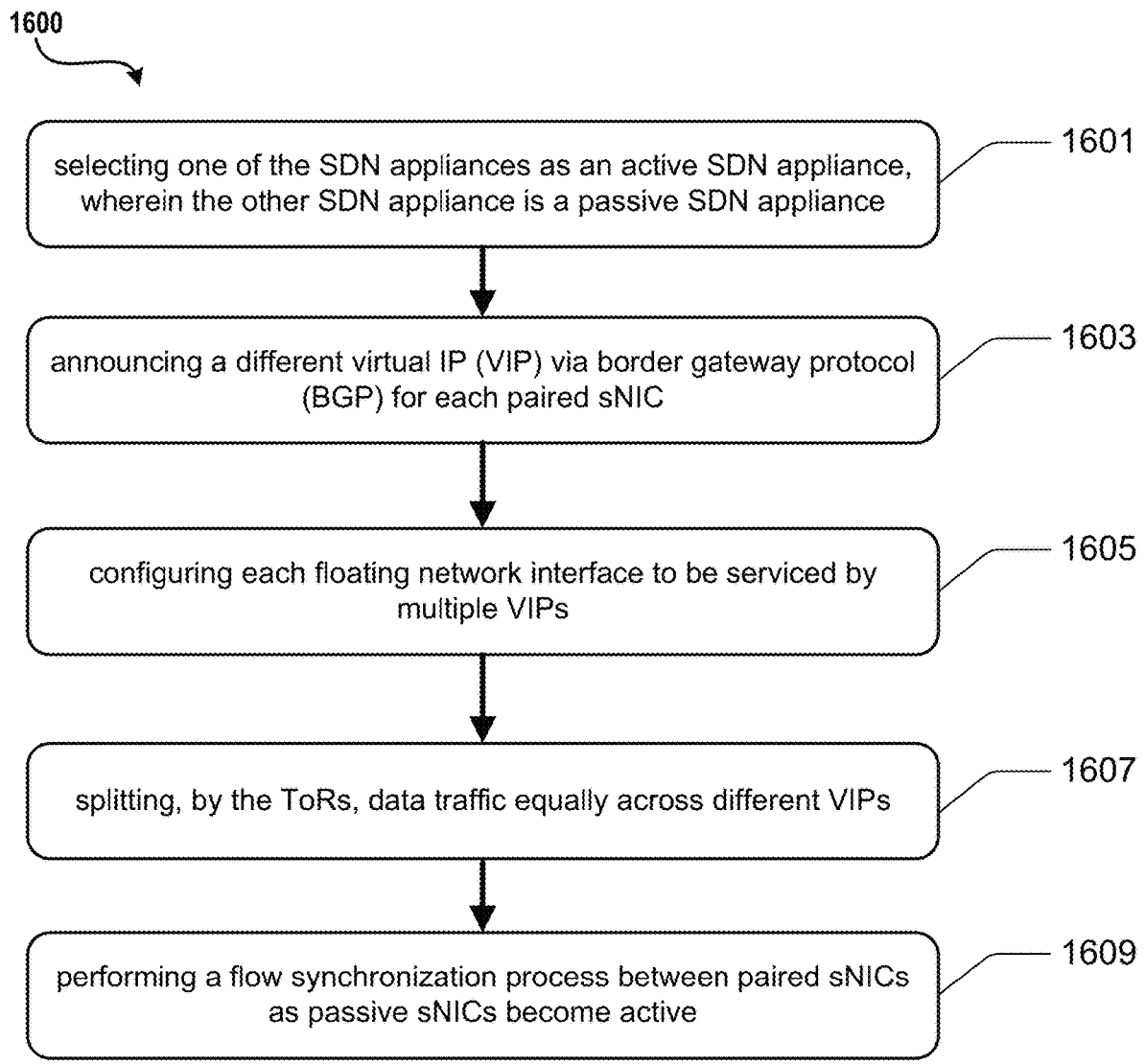
FIG. 16 is a flowchart depicting an example procedure in accordance with the present disclosure.

Turning now to FIG. 16, illustrated is an example operational procedure for processing data packets and implementing policies in a software defined network (SDN) of a virtual computing environment, by at least two SDN appliances configured to disaggregate enforcement of policies of the SDN from hosts of the virtual computing environment. In an embodiment, the hosts may be implemented on servers communicatively coupled to network interfaces of the SDN appliance. In an embodiment, the servers host a plurality of virtual machines. In an embodiment, the servers are communicatively coupled to network interfaces of at least two top-of-rack switches (ToRs) In an embodiment, the SDN appliance comprises a plurality of smart network interface cards (sNICs) configured to implement functionality of the SDN appliance. In an embodiment, the sNICs have a floating network interface configured to provide a virtual port connection to an endpoint within a virtual network of the virtual computing environment. In an embodiment, each sNIC that is associated with the first SDN appliance is paired with an sNIC associated with the second SDN appliance. In an embodiment, each paired sNIC is configured to serve multiple floating network interfaces. In an embodiment, each floating network interface is serviced by multiple sNICs.

Such an operational procedure can be provided by one or more components illustrated in FIGS. 1 through 15. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 1600 is described as running on a system, it can be appreciated that the routine 1600 and other operations described herein can be executed on an individual computing device or several devices.

Referring to FIG. 16, operation 1601 illustrates selecting one of the SDN appliances as an active SDN appliance, wherein the other SDN appliance is a passive SDN appliance.

Operation 1601 may be followed by operation 1603. Operation 1603 illustrates announcing a different virtual IP (VIP) via border gateway protocol (BGP) for each paired sNIC.

Operation 1603 may be followed by operation 1605. Operation 1605 illustrates configuring each floating network interface to be serviced by multiple VIPs.

Operation 1605 may be followed by operation 1607. Operation 1607 illustrates splitting, by the ToRs, data traffic equally across different VIPs.

Operation 1607 may be followed by operation 1609. Operation 1609 illustrates performing a flow synchronization process between paired sNICs as passive sNICs become active.

Figure 17:
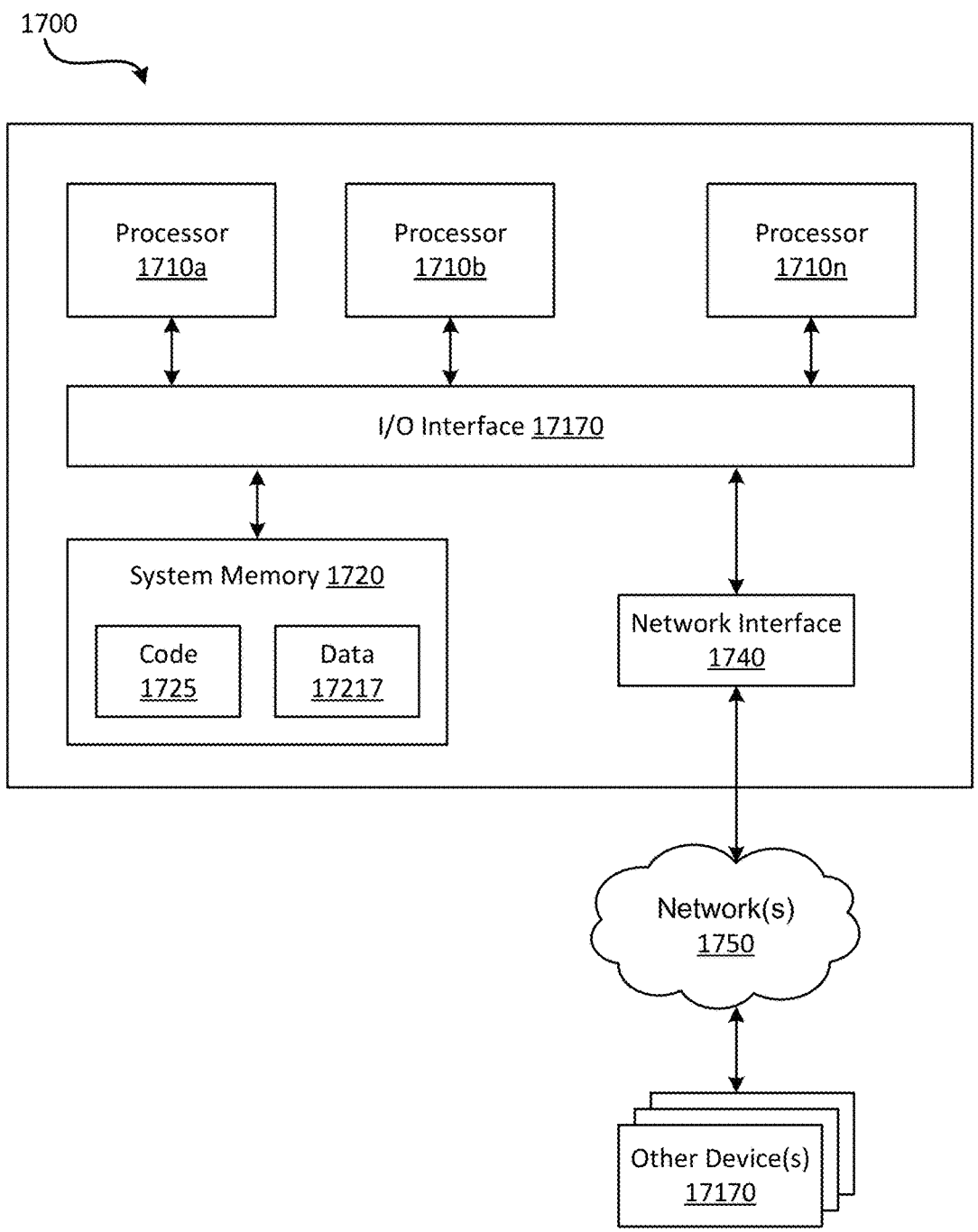
FIG. 17 is an example computing system in accordance with the present disclosure.

FIG. 17 illustrates a general-purpose computing device 1700. In the illustrated embodiment, computing device 1700 includes one or more processors 1710a, 1710b, and/or 1710n (which may be referred herein singularly as "a processor 1710" or in the plural as "the processors 1710") coupled to a system memory 1717 via an input/output (I/O) interface 1730. Computing device 1700 further includes a network interface 1740 coupled to I/O interface 1730.

In various embodiments, computing device 1700 may be a uniprocessor system including one processor 1710 or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x1717, PowerPC, SPARC, or MIPS ISAs, or any other suitable ISA. In multiprocessor systems, each of processors 1710 may commonly, but not necessarily, implement the same ISA.

System memory 1717 may be configured to store instructions and data accessible by processor(s) 1710. In various embodiments, system memory 1717 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1720 as code 1725 and data 17217.

In one embodiment, I/O interface 1730 may be configured to coordinate I/O traffic between the processor 1710, system memory 1717, and any peripheral devices in the device, including network interface 1740 or other peripheral interfaces. In some embodiments, I/O interface 1730 may perform any necessary protocol, timing, or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components. Also, in some embodiments some or all of the functionality of I/O interface 1730, such as an interface to system memory 1720, may be incorporated directly into processor 1710.

Network interface 1740 may be configured to allow data to be exchanged between computing device 1700 and other device or devices 17170 attached to a network or network(s) 17170, such as other computer systems or devices as illustrated in FIGS. 1 through 5, for example. In various embodiments, network interface 1740 may support communication via any suitable wired or wireless general data networks, such as types of Ethernet networks, for example. Additionally, network interface 1740 may support communication via telecommunications/telephony networks such as analog voice networks or digital fiber communications networks, via storage area networks such as Fibre Channel SANs or via any other suitable type of network and/or protocol.

In some embodiments, system memory 1720 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1700 via I/O interface 1730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1700 as system memory 1720 or another type of memory. Further, a computer-accessible medium may include transmission media or signals such as electrical, electromagnetic or digital signals, conveyed via a communication medium such as a network and/or a wireless link, such as may be implemented via network interface 1740. Portions or all of multiple computing devices, such as those illustrated in FIG. 17, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 17, may include other components that are not explicitly shown in FIG. 17, or may utilize an architecture completely different than that shown in FIG. 17.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1:

A method for processing data packets and implementing policies in a software defined network (SDN) of a virtual computing environment, by at least two SDN appliances configured to disaggregate enforcement of policies of the SDN from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC that is associated with the first SDN appliance is paired with an sNIC associated with the second SDN appliance;

each paired sNIC is configured to serve multiple floating network interfaces;

each floating network interface is serviced by multiple sNICs;

the method comprising:

selecting one of the SDN appliances as an active SDN appliance, wherein the other SDN appliance is a passive SDN appliance;

announcing a different virtual IP (VIP) via border gateway protocol (BGP) for each paired sNIC;

configuring each floating network interface to be serviced by multiple VIPs;

splitting, by the ToRs, data traffic equally across different VIPs; and performing a flow synchronization process between paired sNICs as passive sNICs become active.

Clause 2: The method of clause 1, wherein the flow synchronization process comprises:

implementing at least two colors;

associating each connection and entry in a flow table with a color;

establishing a pairing relationship between a primary sNIC and a secondary sNIC; wherein a connection to a paired device can be replicated;

assigning a color to an sNIC that comes online;

as the online SNIC receives traffic, adding new flows to the flow table with the assigned color and replicated new flows to paired sNICs, wherein all connections use the same color until the pairing fails, and continues using the same color if there is no active pairing;

when pairing is re-established, changing the assigned color to a new color;

using the new color for new flows that are added to the flow table and replicating new flows to the paired sNIC; and replicating existing connections to a new device to which a new pairing was created or an existing device to which pairing was re-established, wherein:

only connections which have different color than an actively used color is replicated;

entries with a currently active color are not replicated.

Clause 3: The method of any of clauses 1-2, further comprising clearing a state of a flow table of a secondary sNIC when pairing is re-established.

Clause 4: The method of any of clauses 1-3, further comprising ignoring update messages when a connection does not already exist in a flow table.

Clause 5: The method of any of clauses 1-4, wherein in response to a single card sNIC:

if outage of the single sNIC persists, selecting a different sNIC on another SDN appliance and initiating pairing with an sNIC on the another appliance; and announce a VIP of the selected sNIC as active when flow synchronization completes for all floating network interfaces.

Clause 6: The method of any of clauses 1-5, wherein in response to a single SDN appliance failure: if outage of the single SDN appliance persists, removing existing pairing relationship, allocating a new SDN appliance, and creating a pairing relationship with the new SDN appliance.

Clause 7: A system comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC that is associated with the first SDN appliance is paired with an sNIC associated with the second SDN appliance;

each paired sNIC is configured to serve multiple floating network interfaces;

each floating network interface is serviced by multiple sNICs;

the system configured to:

selecting one of the SDN appliances as an active SDN appliance, wherein the other SDN appliance is a passive SDN appliance;

announcing a different virtual IP (VIP) via border gateway protocol (BGP) for each paired sNIC;

configuring each floating network interface to be serviced by multiple VIPs;

splitting, by the ToRs, data traffic equally across different VIPs; and performing a flow synchronization process between paired sNICs as passive sNICs become active.

Clause 8: The system of clause 7, wherein the flow synchronization process comprises:

implementing at least two colors;

associating each connection and entry in a flow table with a color;

establishing a pairing relationship between a primary sNIC and a secondary sNIC; wherein a connection to a paired device can be replicated;

assigning a color to an sNIC that comes online; and as the online SNIC receives traffic, adding new flows to the flow table with the assigned color and replicated new flows to paired sNICs, wherein all connections use the same color until the pairing fails, and continues using the same color if there is no active pairing;

when pairing is re-established, changing the assigned color to a new color;

using the new color for new flows that are added to the flow table and replicating new flows to the paired sNIC;

replicating existing connections to a new device to which a new pairing was created or an existing device to which pairing was re-established, wherein:

only connections which have different color than an actively used color is replicated;

entries with a currently active color are not replicated.

Clause 9: The system of any of clauses 7 and 8, further comprising clearing a state of a flow table of a secondary sNIC when pairing is re-established.

Clause 10: The system of any clauses 7-9, further comprising ignoring update messages when a connection does not already exist in a flow table.

Clause 11: The system of any clauses 7-10, wherein in response to a single card sNIC:

if outage of the single sNIC persists, selecting a different sNIC on another SDN appliance and initiating pairing with an sNIC on the another appliance; and announce a VIP of the selected sNIC as active when flow synchronization completes for all floating network interfaces.

Clause 12: The system of any clauses 7-11, wherein in response to a single SDN appliance failure: if outage of the single SDN appliance persists, removing existing pairing relationship, allocating a new SDN appliance, and creating a pairing relationship with the new SDN appliance.

Clause 13: The system of any clauses 7-12, wherein 8 colors are implemented that are represented by 3 bits.

Clause 14: The system of any clauses 7-13, wherein flow splitting is performed by an intelligent ToR, on a source based on stable hashing, or directly on a source node.

Clause 15: A data center rack comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC that is associated with the first SDN appliance is paired with an sNIC associated with the second SDN appliance;

each paired sNIC is configured to serve multiple floating network interfaces;

each floating network interface is serviced by multiple sNICs;

the data center rack configured to:

selecting one of the SDN appliances as an active SDN appliance, wherein the other SDN appliance is a passive SDN appliance;

announcing a different virtual IP (VIP) via border gateway protocol (BGP) for each paired sNIC;

configuring each floating network interface to be serviced by multiple VIPs;

splitting, by the ToRs, data traffic equally across different VIPs; and performing a flow synchronization process between paired sNICs as passive sNICs become active.

Clause 16: The computing environment of clause 15, wherein the flow synchronization process comprises:
  implementing at least two colors;
  associating each connection and entry in a flow table with a color;
  establishing a pairing relationship between a primary sNIC and a secondary sNIC; wherein a connection to a paired device can be replicated;
  assigning a color to an sNIC that comes online;
  as the online SNIC receives traffic, adding new flows to the flow table with the assigned color and replicated new flows to paired sNICs, wherein all connections use the same color until the pairing fails, and continues using the same color if there is no active pairing;
  when pairing is re-established, changing the assigned color to a new color;
  using the new color for new flows that are added to the flow table and replicating new flows to the paired sNIC; and
  replicating existing connections to a new device to which a new pairing was created or an existing device to which pairing was re-established, wherein:
    only connections which have different color than an actively used color is replicated;
    entries with a currently active color are not replicated.

Clause 17: The computing environment of any of clauses 15 and 16, further comprising clearing a state of a flow table of a secondary sNIC when pairing is re-established.

Clause 18: The computing environment of any of the clauses 15-17, further comprising ignoring update messages when a connection does not already exist in the flow table.

Clause 19: The computing environment of any of the clauses 15-18, wherein in response to a single card sNIC:
  if outage of a single sNIC persists, selecting a different sNIC on another SDN appliance and initiating pairing with an sNIC on the another appliance; and
  announce a VIP of the selected sNIC as active when flow synchronization completes for all floating network interfaces.

Clause 20: The computing environment of any of the clauses 15-19, wherein in response to a single SDN appliance failure: if outage of the single SDN appliance persists, removing existing pairing relationship, allocating a new SDN appliance, and creating a pairing relationship with the new SDN appliance.

The disclosure presented herein also encompasses the subject matter set forth in the following clauses:

Clause 1: A method for processing data packets in a virtualized computing environment by a hardware-based networking device configured to disaggregate processing of data packets from hosts of the virtualized computing environment, the hardware-based networking device comprising a hardware-based component implementing a plurality of behavioral models indicative of packet processing graphs for data flows in the virtualized computing environment, the method comprising:
  receiving, by the hardware-based networking device, a data packet having a source from or destination to an endpoint in a virtual network of the virtualized computing environment;
  determining that the data packet is a first packet of a data flow to or from the endpoint;
  based on the determination, mapping one of the behavioral models to the data flow;
  modifying the packet in accordance with the mapped behavioral model, wherein the mapped behavioral model is processed in the hardware-based component;
  storing a state of the data flow; and
  processing subsequent data packets of the data flow based on the stored state.

Clause 2: The method of clause 1, further comprising:
  determining that a received subsequent data packet is a last packet of the data flow; and
  in response to the determination, removing the state of the data flow.

Clause 3: The method of any of clauses 1-2, wherein the plurality of behavioral models comprises a threshold number or percentage of data flows of the virtualized computing environment.

Clause 4: The method of any of clauses 1-3, wherein the hardware-based component is one of a flexible hardware engine, specialized processor, or programmable circuit.

Clause 5: The method of any of clauses 1-4, wherein the hardware-based component comprises an inbound packet processing pipeline and outbound packet processing pipeline.

Clause 6: The method of any of clauses 1-5, wherein the flows are stored in the hardware-based component in a GFT.

Clause 7: The method of clauses 1-6, wherein the hardware-based component comprises one or more of a NAT layer, VNET layer, a decapsulation layer, or transposition layer.

Clause 8: The method of any of clauses 1-7, wherein the inbound packet processing pipeline and outbound packet processing pipeline comprise an ACL pipeline.

Clause 9: A hardware-based networking device configured to disaggregate processing of data packets from hosts of a virtualized computing environment, the hardware-based networking device comprising a hardware-based component implementing a plurality of behavioral models indicative of packet processing graphs for data flows in the virtualized computing environment, the hardware-based networking device configured to:
  receive a data packet having a source from or destination to an endpoint in a virtual network of a virtualized computing environment;
  determine that the data packet is a first packet of a data flow to or from the endpoint;
  based on the determination, map one of the behavioral models to the data flow;
  modify the packet in accordance with the mapped behavioral model, wherein the mapped behavioral model is processed in the hardware-based component;
  store a state of the data flow; and
  process subsequent data packets of the data flow based on the stored state.

Clause 10: The hardware-based networking device of clause 9, wherein the hardware-based networking device is further configured to perform packet transformation for VNET to VNET data traffic.

Clause 11: The hardware-based networking device of any of clauses 9 and 10, wherein the hardware-based networking device is further configured to perform packet transformation for load balancer traffic.

Clause 12: The hardware-based networking device of any clauses 9-11, wherein the hardware-based networking device is further configured to perform packet transformation for private link traffic.

Clause 13: The hardware-based networking device of any clauses 9-12, wherein the hardware-based networking device is further configured to perform packet transformation for service tunneling.

Clause 14: The hardware-based networking device of any clauses 9-13, wherein the hardware-based networking device is further configured to perform packet transformation for one or more of VNET encryption, telemetry, BGP, debugging, or flow replication.

Clause 15: The hardware-based networking device of any clauses 9-14, wherein the hardware-based networking device is further configured to:

determine that a received subsequent data packet is a last packet of the data flow; and in response to the determination, remove the state of the data flow.

Clause 16: A computing environment comprising a plurality of computing devices and one or more hardware-based networking devices configured to disaggregate processing of data packets from the plurality of computing devices, the hardware-based networking device comprising a hardware-based component implementing a plurality of behavioral models indicative of packet processing graphs for data flows in the computing environment, the hardware-based networking device configured to:

receive a data packet having a source from or destination to an endpoint in a virtual network of a virtualized computing environment;

determine that the data packet is a first packet of a data flow to or from the endpoint;

based on the determination, map one of the behavioral models to the data flow;

modify the packet in accordance with the mapped behavioral model, wherein the mapped behavioral model is processed in the hardware-based component;

store a state of the data flow; and process subsequent data packets of the data flow based on the stored state.

Clause 17: The computing environment of clause 16, wherein the plurality of behavioral models comprises a threshold number or percentage of data flows of the virtualized computing environment.

Clause 18: The computing environment of any of clauses 16 and 17, wherein the hardware-based component is one of a flexible hardware engine, specialized processor, or programmable circuit.

Clause 19: The computing environment of any of the clauses 16-18, wherein the hardware-based component comprises an inbound packet processing pipeline and outbound packet processing pipeline.

Clause 20: The computing environment of any of the clauses 16-19, wherein the flows are stored in the hardware-based component in a GFT.

The disclosure presented herein also encompasses the subject matter set forth in the following clauses:

Clause 1:

A method for processing data packets and implementing policies in a software defined network (SDN) of a virtual computing environment, by at least one SDN appliance configured to disaggregate enforcement of policies of the SDN from hosts of the virtual computing environment, the hosts implemented on servers communicatively coupled to network interfaces of the SDN appliance, the servers hosting a plurality of virtual machines, the SDN appliance comprising a plurality of smart network interface cards (sNICs) configured to implement functionality of the SDN appliance, the method comprising:

receiving, at the SDN appliance from a device that is remote from the virtual computing environment, a data packet addressed to an endpoint in a virtual network hosted by one of the virtual machines, the data packet comprising an identifier indicative of the remote device;

based on the identifier:

determining that the data packet is associated with the virtual network; and based on the determined association, mapping one of a plurality of policies to a data flow of the virtual network;

modifying, by the SDN appliance, the packet in accordance with the mapped policy; wherein the mapped policy is dynamically adjustable based on the data flow; and forwarding the modified packet to the endpoint in the virtual network.

Clause 2: The method of clause 1, wherein the SDN appliance is implemented as a distributed appliance where the sNICs are physically distributed among the servers.

Clause 3: The method of any of clauses 1-2, wherein the SDN appliance is implemented as two physical devices that are communicatively coupled to at least two top-of-rack switches, the servers communicatively coupled to network interfaces of the top-of-rack switches so that each of the servers have a switchable communications path to each sNIC of the physical devices.

Clause 4: The method of any of clauses 1-3, wherein storage traffic bypasses the sNICs.

Clause 5: The method of any of clauses 1-4, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 6: The method of any of clauses 1-5, wherein at least two top-of-rack switches are configured with SDN agents configured to manage functionality of the SDN appliance.

Clause 7: A system comprising:

a plurality of servers communicatively coupled to at least one software defined network (SDN) appliance configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the SDN appliance comprising a plurality of smart network interface cards (sNICs) configured to implement functionality of the SDN appliance;

the system configured to:

receive, from a device that is remote from the virtual computing environment, a data packet addressed to an endpoint in a virtual network hosted by one of the virtual machines, the data packet comprising an identifier indicative of the remote device;

based on the identifier:

determining that the data packet is associated with the virtual network; and based on the determined association, mapping one of a plurality of policies to a data flow of the virtual network;

modifying, by the SDN appliance, the packet in accordance with the mapped policy; wherein the mapped policy is dynamically adjustable based on the data flow; and forwarding the modified packet to the endpoint in the virtual network.

Clause 8: The system of clause 7, wherein the SDN appliance is implemented as a distributed appliance where the sNICs are physically distributed among the plurality of servers.

Clause 9: The system of any of clauses 7 and 8, wherein the SDN appliance is implemented as two physical devices that are communicatively coupled to at least two top-of-rack switches, the servers communicatively coupled to network interfaces of the top-of-rack switches so that each of the servers have a switchable communications path to each sNIC of the physical devices.

Clause 10: The system of any clauses 7-9, wherein storage traffic bypasses the sNICs.

Clause 11: The system of any clauses 7-10, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 12: The system of any clauses 7-11, wherein at least two top-of-rack switches are configured with SDN agents configured to manage functionality of the SDN appliance.

Clause 13: The system of any clauses 7-12, wherein the policy is applied at selectively placed network hops in the virtual network.

Clause 14: The system of any clauses 7-13, wherein the SDN appliance is configured to apply policies of the virtual computing environment to data traffic on the virtual network after the data traffic leaves its source and before the data traffic reaches its destination.

Clause 15: A data center rack comprising:
a plurality of servers; the servers communicatively coupled to at least one software defined network (SDN) appliance configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the SDN appliance comprising a plurality of smart network interface cards (sNICs) configured to implement functionality of the SDN appliance;
the data center rack configured to:
receive, from a device that is remote from a software defined network (SDN) of a virtual computing environment, a data packet addressed to an endpoint in a virtual network hosted by one of the virtual machines, the data packet comprising an identifier indicative of the remote device;
based on the identifier:
determining that the data packet is associated with the virtual network; and
based on the determined association, mapping one of a plurality of policies to a data flow of the virtual network;
modifying, by the SDN appliance, the packet in accordance with the mapped policy; wherein the mapped policy is dynamically adjustable based on the data flow; and
forwarding the modified packet to the endpoint in the virtual network.

Clause 16: The computing environment of clause 15, wherein the SDN appliance is implemented as a distributed appliance where the sNICs are physically distributed among the plurality of servers.

Clause 17: The computing environment of any of clauses 15 and 16, wherein the SDN appliance is implemented as two physical devices that are communicatively coupled to at least two top-of-rack switches, the servers communicatively coupled to network interfaces of the top-of-rack switches so that each of the servers have a switchable communications path to each sNIC of the physical devices.

Clause 18: The computing environment of any of the clauses 15-17, wherein storage traffic bypasses the sNICs.

Clause 19: The computing environment of any of the clauses 15-18, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 20: The computing environment of any of the clauses 15-19, wherein at least two top-of-rack switches are configured with SDN agents configured to manage functionality of the SDN appliance.

The disclosure presented herein also encompasses the subject matter set forth in the following clauses:
Clause 1:
A method for processing data packets and implementing policies in a software defined network (SDN) of a virtual computing environment, by at least two SDN appliances configured to disaggregate enforcement of policies of the SDN from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:
each sNIC is associated with the first SDN appliance is paired with an sNIC associated with the second SDN appliance;
each paired sNIC is configured to serve a same floating network interface;
the method comprising:
selecting one of the SDN appliances as an active SDN appliance, wherein the other SDN appliance is a passive SDN appliance;
announcing a same virtual IP (VIP) via border gateway protocol (BGP) for each paired sNIC;
for each paired sNIC, replicating active flows from an active sNIC to a passive sNIC; and
in response to a failure of the active SDN appliance:
withdrawing routes from the active SDN appliance; and
causing the ToRs to redirect data traffic to the passive SDN appliance.

Clause 2: The method of clause 1, further comprising:
receiving, from a device that is remote from the virtual computing environment, a data packet addressed to an endpoint in a virtual network hosted by one of the virtual machines, the data packet comprising an identifier indicative of the remote device;
based on the identifier:
determining that the data packet is associated with the virtual network; and
based on the determined association, mapping one of a plurality of policies to a data flow of the virtual network;
modifying the packet in accordance with the mapped policy; wherein the mapped policy is dynamically adjustable based on the data flow; and forwarding the modified packet to the endpoint in the virtual network.

Clause 3: The method of any of clauses 1-2, wherein the VIP is announced via short path using BGP, further comprising announcing a second VIP announced with a long path using BGP, wherein the second VIP is used by the floating network interfaces when in passive mode.

Clause 4: The method of any of clauses 1-3, wherein paired sNICs announce the same set of VIPs.

Clause 5: The method of any of clauses 1-4, wherein flow replication is based on the floating network interfaces, and the direction of flow replication is active to passive.

Clause 6: The method of any of clauses 1-5, wherein a single floating network interface is programmed on multiple sNICs.

Clause 7: A system comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC is associated with the first SDN appliance is paired with an sNIC associated with the second SDN appliance;

each paired sNIC is configured to serve a same floating network interface;

the system configured to:

select one of the SDN appliances as an active SDN appliance, wherein the other SDN appliance is a passive SDN appliance;

announce a same virtual IP (VIP) via border gateway protocol (BGP) for each paired sNIC;

for each paired sNIC, replicate active flows from an active sNIC to a passive sNIC; and in response to a failure of the active SDN appliance, withdraw routes from the active SDN appliance and cause the ToRs to redirect data traffic to the passive SDN appliance.

Clause 8: The system of clause 7, wherein the ToRs are configured to perform traffic load balancing, splitting, or sharding for selected floating network interfaces across VIPs of cards on which the selected floating network interface is provisioned.

Clause 9: The system of any of clauses 7 and 8, wherein a control plane of the virtual computing environment is configured to create pairing relationships between sNICs, wherein the paired sNICs are configured with a same ENI and policy.

Clause 10: The system of any clauses 7-9, wherein in response to a failure of an SDN appliance not available for a threshold period of time:

withdrawing the pairing relationship from an associated sNIC; and establishing a new pairing to another sNIC.

Clause 11: The system of any clauses 7-10, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 12: The system of any clauses 7-11, wherein the VIP is announced via short path using BGP, further comprising announcing a second VIP announced with a long path using BGP,k wherein the second VIP is used by the floating network interfaces when in passive mode.

Clause 13: The system of any clauses 7-12, wherein paired sNICs announce the same set of VIPs.

Clause 14: The system of any clauses 7-13, wherein flow replication is based on the floating network interfaces, and the direction of flow replication is active to passive.

Clause 15: A data center rack comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC is associated with the first SDN appliance is paired with an sNIC associated with the second SDN appliance;

each paired sNIC is configured to serve a same floating network interface;

the data center rack configured to:

select one of the SDN appliances as an active SDN appliance, wherein the other SDN appliance is a passive SDN appliance;

announce a same virtual IP (VIP) via border gateway protocol (BGP) for each paired sNIC;

for each paired sNIC, replicate active flows from an active sNIC to a passive sNIC; and in response to a failure of the active SDN appliance, withdraw routes from the active SDN appliance and cause the ToRs to redirect data traffic to the passive SDN appliance.

Clause 16: The computing environment of clause 15, wherein the VIP is announced via short path using BGP, further comprising announcing a second VIP announced with a long path using BGP, wherein the second VIP is used by the floating network interfaces when in passive mode.

Clause 17: The computing environment of any of clauses 15 and 16, wherein paired sNICs announce the same set of VIPs.

Clause 18: The computing environment of any of the clauses 15-17, wherein flow replication is based on the floating network interfaces, and the direction of flow replication is active to passive.

Clause 19: The computing environment of any of the clauses 15-18, wherein a single floating network interface is programmed on multiple sNICs.

Clause 20: The computing environment of any of the clauses 15-19, wherein the ToRs are configured to perform traffic load balancing, splitting, or sharding for selected floating network interfaces across VIPs of cards on which the selected floating network interface is provisioned.

What is claimed is:

1. A method for processing data packets and implementing policies in a software defined network (SDN) of a virtual computing environment, by at least two SDN appliances configured to disaggregate enforcement of policies of the SDN from hosts of the virtual computing environment, the hosts implemented on servers communicatively coupled to network interfaces of the SDN appliances, the servers hosting a plurality of virtual machines, the servers communicatively coupled to at least two top-of-rack switches (ToRs), the SDN appliances comprising a plurality of smart network interface cards (sNICs) configured to implement functionality of the SDN appliances, the sNICs having a floating network interface configured to provide a virtual port connection to an endpoint within a virtual network of the virtual computing environment, wherein:
- each sNIC that is associated with a first of the SDN appliances is paired with an sNIC associated with a second of the SDN appliances;
- each of the paired sNICs is configured to serve multiple floating network interfaces; and
- each floating network interface is serviced by multiple ones of the paired sNICs;

the method comprising:
- selecting the first SDN appliance as an active SDN appliance, wherein the second SDN appliance is a passive SDN appliance;
- announcing, on the virtual network, a unique virtual IP (VIP) address via border gateway protocol (BGP) for each of the paired sNICs;
- configuring each of the multiple floating network interfaces to be serviced by at least two VIP addresses;
- splitting, by the ToRs, data traffic on the virtual network across different ones of the VIP addresses;
- determining that the second SDN appliance has become active; and
- in response to determining that the second SDN appliance has become active, performing a flow synchronization process between the paired sNICs of the first and second SDN appliances.

2. The method of claim 1, wherein the flow synchronization process comprises:
- implementing at least two colors;
- associating each connection and entry in a flow table with a color;
- establishing a pairing relationship between a primary sNIC and a secondary sNIC; wherein a connection to a paired device can be replicated;
- assigning a color to an sNIC that comes online;
- as the online SNIC receives traffic, adding new flows to the flow table with the assigned color and replicated new flows to paired sNICs, wherein all connections use the same color until the pairing fails, and continues using the same color if there is no active pairing;
- when pairing is re-established, changing the assigned color to a new color;
- using the new color for new flows that are added to the flow table and replicating new flows to the paired sNIC; and
- replicating existing connections to a new device to which a new pairing was created or an existing device to which pairing was re-established, wherein:
  - only connections which have different color than an actively used color is replicated;
  - entries with a currently active color are not replicated.

3. The method of claim 2, further comprising clearing a state of a flow table of a secondary sNIC when pairing is re-established.

4. The method of claim 1, further comprising ignoring update messages when a connection does not already exist in a flow table.

5. The method of claim 1, wherein in response to a single card sNIC failure:
- if an outage of the single card sNIC persists, selecting a different sNIC on another SDN appliance and initiating pairing with an sNIC on the another SDN appliance; and
- announcing a VIP of the selected sNIC as active when flow synchronization completes for all floating network interfaces.

6. The method of claim 1, wherein in response to a single SDN appliance failure: if an outage of the single SDN appliance failure persists, removing an existing pairing relationship, allocating a new SDN appliance, and creating a pairing relationship with the new SDN appliance.

7. A system comprising:
- a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliances, the servers hosting a plurality of virtual machines, the servers communicatively coupled to at least two top-of-rack switches (ToRs), the SDN appliances comprising a plurality of smart network interface cards (sNICs) configured to implement functionality of the SDN appliances, the sNICs having a floating network interface configured to provide a virtual port connection to an endpoint within a virtual network of the virtual computing environment, wherein:
- each sNIC that is associated with a first of the SDN appliances is paired with an sNIC associated with a second of the SDN appliances;
- each of the paired sNICs is configured to serve multiple floating network interfaces; and
- each floating network interface is serviced by multiple ones of the paired sNICs;

the system configured to:
- selecting the first SDN appliance as an active SDN appliance, wherein the second SDN appliance is a passive SDN appliance;
- announcing, on the virtual network, a unique virtual IP (VIP) address via border gateway protocol (BGP) for each of the paired sNICs;
- configuring each of the multiple floating network interfaces to be serviced by at least two VIP addresses;
- splitting, by the ToRs, data traffic on the virtual network across different ones of the VIP addresses;
- determining that the second SDN appliance has become active; and
- in response to determining that the second SDN appliance has become active, performing a flow synchronization process between the paired sNICs of the first and second SDN appliances.

8. The system of claim 7, wherein the flow synchronization process comprises:
- implementing at least two colors;
- associating each connection and entry in a flow table with a color;
- establishing a pairing relationship between a primary sNIC and a secondary sNIC; wherein a connection to a paired device can be replicated;
- assigning a color to an sNIC that comes online; and as the online SNIC receives traffic, adding new flows to the flow table with the assigned color and replicated new flows to paired sNICs, wherein all connections use the same color until the pairing fails, and continues using the same color if there is no active pairing;

when pairing is re-established, changing the assigned color to a new color;

using the new color for new flows that are added to the flow table and replicating new flows to the paired sNIC;

replicating existing connections to a new device to which a new pairing was created or an existing device to which pairing was re-established, wherein:

only connections which have different color than an actively used color is replicated;

entries with a currently active color are not replicated.

9. The system of claim 8, further comprising clearing a state of a flow table of a secondary sNIC when pairing is re-established.

10. The system of claim 8, wherein 8 colors are implemented that are represented by 3 bits.

11. The system of claim 7, further comprising ignoring update messages when a connection does not already exist in a flow table.

12. The system of claim 7, wherein in response to a single card sNIC failure:
if an outage of the single sNIC persists, selecting a different sNIC on another SDN appliance and initiating pairing with an sNIC on the another appliance; and
announcing a VIP of the selected sNIC as active when flow synchronization completes for all floating network interfaces.

13. The system of claim 7, wherein in response to a single SDN appliance failure: if an outage of the single SDN appliance persists, removing an existing pairing relationship, allocating a new SDN appliance, and creating a pairing relationship with the new SDN appliance.

14. The system of claim 7, wherein flow splitting is performed by an intelligent ToR, on a source based on stable hashing, or directly on a source node.

15. A data center rack comprising:
a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliances, the servers hosting a plurality of virtual machines, the servers communicatively coupled to at least two top-of-rack switches (ToRs), the SDN appliances comprising a plurality of smart network interface cards (sNICs) configured to implement functionality of the SDN appliances, the sNICs having a floating network interface configured to provide a virtual port connection to an endpoint within a virtual network of the virtual computing environment, wherein:
each sNIC that is associated with a first of the SDN appliances is paired with an sNIC associated with a second of the SDN appliances;
each of the paired sNICs is configured to serve multiple floating network interfaces; and
each floating network interface is serviced by multiple ones of the paired sNICs;
the data center rack configured to:
selecting the first SDN appliance as an active SDN appliance, wherein the second SDN appliance is a passive SDN appliance;
announcing, on the virtual network, a unique virtual IP (VIP) address via border gateway protocol (BGP) for each of the paired sNICs;
configuring each of the multiple floating network interfaces to be serviced by at least two VIP addresses;
splitting, by the ToRs, data traffic on the virtual network across different ones of the VIP addresses;
determining that the second SDN appliance has become active; and
in response to determining that the second SDN appliance has become active, performing a flow synchronization process between the paired sNICs of the first and second SDN appliances.

16. The data center rack of claim 15, wherein the flow synchronization process comprises:
implementing at least two colors;
associating each connection and entry in a flow table with a color;
establishing a pairing relationship between a primary sNIC and a secondary sNIC; wherein a connection to a paired device can be replicated;
assigning a color to an sNIC that comes online;
as the online SNIC receives traffic, adding new flows to the flow table with the assigned color and replicated new flows to paired sNICs, wherein all connections use the same color until the pairing fails, and continues using the same color if there is no active pairing;
when pairing is re-established, changing the assigned color to a new color;
using the new color for new flows that are added to the flow table and replicating new flows to the paired sNIC; and
replicating existing connections to a new device to which a new pairing was created or an existing device to which pairing was re-established, wherein:
only connections which have different color than an actively used color is replicated;
entries with a currently active color are not replicated.

17. The data center rack of claim 15, further comprising clearing a state of a flow table of a secondary sNIC when pairing is re-established.

18. The data center rack of claim 17, further comprising ignoring update messages when a connection does not already exist in the flow table.

19. The data center rack of claim 17, wherein in response to a single SDN appliance failure: if an outage of the single SDN appliance persists, removing an existing pairing relationship, allocating a new SDN appliance, and creating a pairing relationship with the new SDN appliance.

20. The data center rack of claim 15, wherein in response to a single card sNIC:
if an outage of a single sNIC persists, selecting a different sNIC on another SDN appliance and initiating pairing with an sNIC on the another SDN appliance; and
announcing a VIP of the selected sNIC as active when flow synchronization completes for all floating network interfaces.

* * * * *